(12) United States Patent
Saito

(10) Patent No.: US 10,102,442 B2
(45) Date of Patent: Oct. 16, 2018

(54) IMAGE-PROCESSING DEVICE AND IMAGE-PROCESSING METHOD

(71) Applicant: OLYMPUS CORPORATION, Hachioji-shi, Tokyo (JP)

(72) Inventor: Yoko Saito, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 86 days.

(21) Appl. No.: 15/340,165

(22) Filed: Nov. 1, 2016

(65) Prior Publication Data
US 2017/0140239 A1 May 18, 2017

(30) Foreign Application Priority Data

Nov. 16, 2015 (JP) ................................. 2015-223666

(51) Int. Cl.
| | |
|---|---|
| H04N 5/228 | (2006.01) |
| G06K 9/46 | (2006.01) |
| G06K 9/00 | (2006.01) |
| G06T 7/20 | (2017.01) |
| H04N 5/232 | (2006.01) |
| G06T 7/246 | (2017.01) |

(52) U.S. Cl.
CPC ......... G06K 9/4604 (2013.01); G06K 9/0063 (2013.01); G06K 9/00577 (2013.01); G06K 9/00751 (2013.01); G06T 7/20 (2013.01); G06T 7/246 (2017.01); H04N 5/23229 (2013.01); H04N 5/23293 (2013.01); G06T 2207/10016 (2013.01); G06T 2207/30241 (2013.01)

(58) Field of Classification Search
CPC ............ G06K 9/4604; G06K 9/00751; G06K 9/0063; G06K 9/00577; H04N 5/23229; H04N 5/23293; G06T 7/246; G06T 7/20; G06T 2207/30241; G06T 2207/10016
USPC ............................ 348/222.1, 333.01–333.09
See application file for complete search history.

(56) References Cited

U.S. PATENT DOCUMENTS

2011/0063162 A1* 3/2011 Kojima ................... G01S 7/066
342/164
2014/0347519 A1 11/2014 Yamamoto

FOREIGN PATENT DOCUMENTS

JP 2013062740 A 4/2013

\* cited by examiner

Primary Examiner — Yogesh Aggarwal
(74) Attorney, Agent, or Firm — Volpe and Koenig, P.C.

(57) ABSTRACT

An image processing device comprises a trail extraction section that extracts a region where pixel values continuously become a given value or more, within image data made up of a plurality of pixel values, as a trail, a trail determination section that determines movement state of the trail that has been extracted by the trail extraction section, and a trail detection section that detects type of the trail based on movement state that has been determined by the trail determination section.

8 Claims, 15 Drawing Sheets

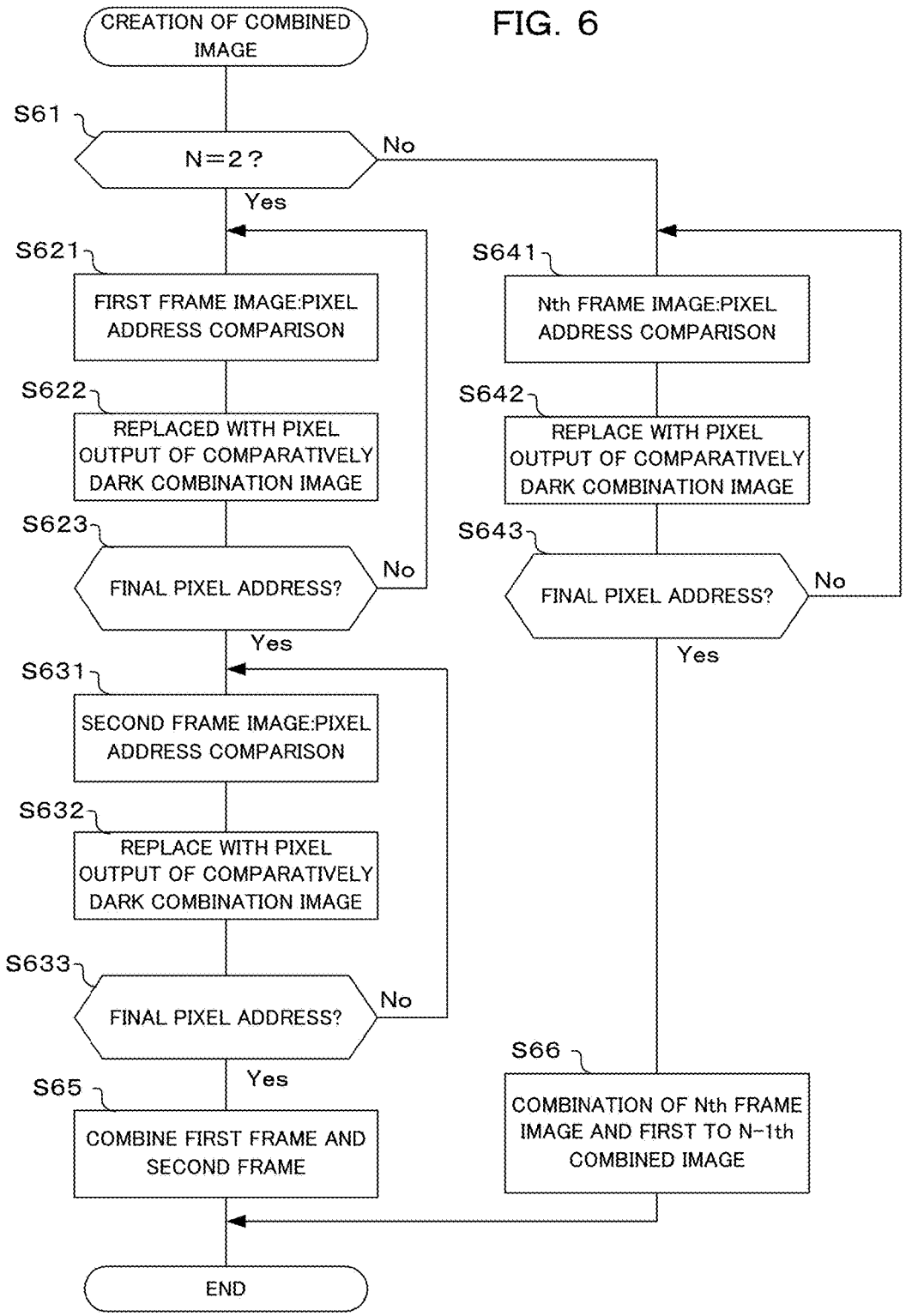

IMAGE-PROCESSING DEVICE AND IMAGE-PROCESSING METHOD

Benefit is claimed, under 35 U.S.C. § 119, to the filing date of prior Japanese Patent Application No. 2015-223666 filed on Nov. 16, 2015. This application is expressly incorporated herein by reference. The scope of the present invention is not limited to any requirements of the specific embodiments described in the application.

BACKGROUND OF THE INVENTION

1. Field of the Invention

The present invention relates to an image processing device that analyzes image data and further combines image data using results of this analysis, and to an image processing method.

2. Description of the Related Art

A shooting procedure for shooting light trails of stars that move in accordance with the earth's spin, or fireworks, or light trails of fireflies etc. in a single photograph is generally carried out using long exposure time.

With digital cameras commercially available in recent years, for a plurality of images that have been consecutively taken, a method is performed in which these images are subjected to additive combination or comparatively bright combination processing using an image processing function within the digital camera or an image combination function using image processing software that uses a PC (personal Computer) that will be described later, to give a single image in which the above described light trails are captured.

For example, Japanese patent laid open No. 2013-62740 (hereafter referred to as "patent document 1") proposes a camera that can shoot light trails by subjecting a plurality of images that have been taken consecutively to comparatively bright combination processing. This camera, compared to carrying out combination processing after shooting, using a PC or the like, can shoot light trails easily since combination processing is carried out automatically while the camera is shooting. On the other hand, in a case of carrying out combination processing after shooting using a PC, it is possible to combine photographs in which desired long light trails are captured by changing a number of frames to be combined and combining those frames, and to use various image processing functions that do not exist in the image processing program built in to the camera, and it is possible to create a photograph that is in line with the photographers desire using fine image quality adjustments.

However, with the camera disclosed in patent publication 1, for example, if, during shooting with light trails of stars as a subject, light trails that are different to those of stars, for example, aircraft or man-made satellite, are captured in the subject, it will result in a photograph that a photographer, who wishes to shoot with light trails of stars as a main subject, would be reluctant to accept. The same also applies not only to stars but also to when combining dramatic photographs taken with light trails of other than stars, such as fireflies and fireworks, as a main subject. Also, while there is a demand wherein a photographer wishes to adjust images for each different type of light trail (for example, carrying out adjustment of image quality so that the colors in firework trails standout without changing light of a background or stars etc.), this demand can not be met because it is not possible to differentiate for each trail.

SUMMARY OF THE INVENTION

An object of the present invention is to provide an image processing device and image processing method that can detect various light trails captured in an image in accordance with type of trail.

An image processing device of a first aspect of the present invention comprises a trail extraction section that extracts a region where pixel values continuously become a given value or more, within image data made up of a plurality of pixel values, as a trail, a trail determination section that determines movement state of the trail that has been extracted by the trail extraction section, and a trail detection section that detects type of the trail based on movement state that has been determined by the trail determination section.

An image processing method of a second aspect of the present invention comprises extracting a region where pixel values continuously become a given value or more, within image data made up of a plurality of pixel values, as a trail, determining movement state of the extracted trail, and carrying out processing to detect type of each of the trails based on the determined movement state.

BRIEF DESCRIPTION OF THE DRAWINGS

FIG. 6 is a flowchart showing an operating sequence for combining image data, in the camera of the first embodiment of the present invention.

DETAILED DESCRIPTION OF THE PREFERRED EMBODIMENTS

Overview of the Embodiments

Embodiments of an image processing device of this invention will be described in the following, with reference to the attached drawings. The following embodiments are examples of an image processing device of the present invention applied to a digital camera.

First Embodiment

Figure 1:
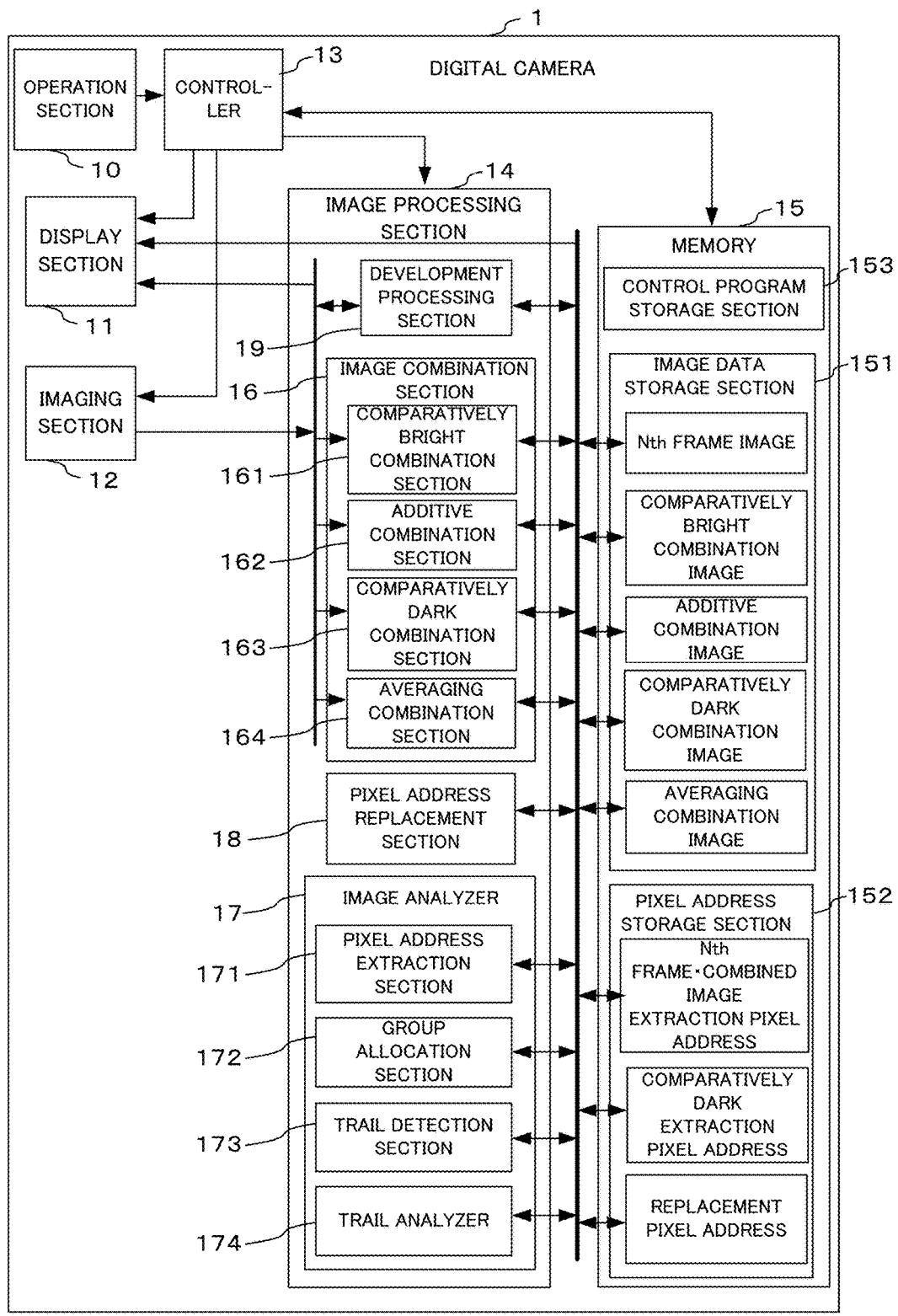
FIG. 1 is a block diagram mainly showing the electrical structure of a camera of a first embodiment of the present invention.

First, the structure of a digital camera of this embodiment will be described using FIG. 1. FIG. 1 shows a block diagram of internal parts of the digital camera. The digital camera 1 of this embodiment comprises an imaging section 12, operation section 10, display section 11, image processing section 14, memory 15 and control section 13.

The imaging section 12 is provided with a lens, shutter and image sensor etc., although these are not shown. The lens is a photographing optical system for forming an image of a subject on the image sensor. Also, an aperture mechanism is provided within the lens, and light amount incident on the image sensor is adjusted by adjusting aperture opening amount using the aperture mechanism. The shutter is arranged between the lens and the image sensor, and shielding of light to the image sensor, incidence control and control of incident time (shutter speed) are controlled by switching open and closed states of the shutter. It should be noted that the shutter and/or aperture may be omitted from the imaging section 12 by controlling exposure using an electronic shutter etc.

The image sensor is an image sensor such as a CCD image sensor or a CMOS image sensor, and converts an optical image that has been made incident on a plurality of pixels that have been arranged two-dimensionally into an electrical signal (video signal) in accordance with intensity of that light on each individual pixel. The electrical signal corresponding to each of the individual pixels is then converted to digital output values and output as image data.

The operation section 10 has operation input means that use various buttons, a dial operation section for selecting operation menus, or a touch panel that is formed integrally with the display section 11, although these input means are not shown, and is equivalent to an input IF (interface) for the photographer to operate the digital camera 1. The display section 11 is a liquid crystal panel or organic EL (Electro Luminescence) display, and performs display of operating menus for the digital camera and live view images at the time of live view shooting, and performs playback display of taken images. The image processing section 14 is provided with an image combination section 16, image analysis section 17, pixel address replacement section 18 and development processing section 19.

The image combination section 16 carries out combination processing on image data of a plurality of frames that have been taken by the imaging section 12 or on image data of a plurality of frames that have been stored in the memory 15, and generates combined image data which is image data after the combination processing. The image combination section 16 also contains means for carrying out a plurality of types of image combination processing, and is specifically provided with a comparatively bright combination section 161, a comparatively dark combination section 163, an additive combination section 162, and an averaging combination section 164.

The comparatively bright combination section 161 subjects image data of a plurality of frames that will be combined to combination processing by comparing outputs of pixel data at respectively identical addresses, and making outputs of pixel data that are the largest as a result of the comparison pixel outputs for image data after combination. In the event that pixel outputs are equal, that output is made the image data after combination.

The comparatively dark combination section 163 subjects image data of a plurality of frames that will be combined to combination processing by comparing outputs of pixel data at respectively identical addresses, and making outputs of pixel data that are the smallest as a result of the comparison pixel outputs for image data after combination. In the event that pixel outputs are equal, that output is made the image data after combination.

The additive combination section 162 subjects image data of a plurality of frames that will be combined to combination processing that makes values derived by adding pixel data at respectively identical addresses pixel output for image data after combination. The averaging combination section 164 subjects image data of a plurality of frames that will be combined to combination processing that makes values derived by averaging pixel data at respectively identical addresses pixel output for image data after combination.

Also, the pixel address replacement section 18 applies processing to replace unnecessary light trails in image data before combination (equivalent to image data sequentially obtained from the imaging section 12) or image data after combination that has been generated by the image combination section 16, with background pixel output, using analysis results of the image analysis section 17, which will be described later. Detailed operation will be described later.

The image analysis section 17 comprises a pixel address extraction section 171, group allocation section 172, trail detection section 173 and trail analyzer 174. The pixel address extraction section 171 extracts pixels of a designated brightness or greater from image data before combination or image data after combination that has been generated by the image combination section 16. The group allocation section 172 carries out processing to allocate, from among pixels that have been extracted by the pixel address extraction section 171, a group of pixels that are adjacent to these pixels as a single group. The pixel address extraction section 171 and the group allocation section 172 function as a trail extraction section.

The trail analyzer 174 analyzes each group that has been allocated by the group allocation section 172 using a method that will be described later. The trail analyzer 174 functions as a trail determination section. The trail detection section 173 detects a plurality of trails that have been captured in image data before combination, or in comparatively bright combination image data or additively combined image data that has been combined by the image combination section 16, based on analysis results of the trail analyzer 174. The trail detection section 173 functions as a trail detection section.

The development processing section 19 subjects image data that has been read out by the imaging section 12 and combined image data that has been combined by the image combination section 16 to various types of image processing that are carried out by an ordinary digital camera, such as demosaicing processing, gamma correction processing, noise reduction processing, white balance gain application, and resizing processing to change image size in conformity with the image resolution of a display device of the display section 11.

The memory 15 has a non-volatile memory that can be removed from the digital camera 1, such as Flash memory, SD card or CF card (registered trademark) etc., and the RAM memory which is volatile memory. The memory 15 is provided with an image data storage section 151, pixel address storage section 152 and control program storage section 153.

The image data storage section 15 first stores and retains image data such as image data that has been taken by the imaging section 12 color and combined image data that has been combined by the image combination section 16. The pixel address storage section 152 stores addresses of pixels, such as extraction pixel addresses that have been detected by the image analysis section 17, and pixel addresses of unnecessary light trails when deleting unnecessary light trails with the pixel address replacement section 18, which will be described later. The control program storage section 153 holds a control program for controlling each section of the digital camera using the control section 13.

The control section 13 has a CPU (Central processing unit) and peripheral circuits for the CPU, and carries out unified control for each section of the camera in accordance with operation instructions by the photographer that have been input by means of the operation section 10 and a control program that is stored in the control program storage section 153. As a specific example, imaging control for the imaging section 12, designation of processing content for the image processing section 14, and operational control for the memory 15 etc. are carried out. Further, a bus line is connected between the image combination section 16 and the memory 15 as a data signal pathway.

Operational Description of the First Embodiment

Next, operation of a digital camera of a first embodiment of the present invention will be described using FIG. 2 to FIG. 6. An operating sequence of this embodiment is shown as operation for a case where continuous shooting mode has been selected, wherein image data is continuously captured by the imaging section 12, and image data of a plurality of captured frames are combined. First, the imaging section 12 commences continuous shooting as a result of an instruction of the control section 13, image data is read out from the imaging section 12, and the image data that has been read out is held in the image data storage section 151 (S1).

The control section 13 determines whether or not an image of an Nth frame that has been read out from the imaging section 12 is taken image data of a second or later frame after commencement of continuous shooting (S2). If the result of determination processing in step S2 is that the captured image data is image data of a first frame (No), a standby state is entered until image data of a second or later frame is read out, and the processing of subsequent steps (S3 and steps S7 and afterwards) is not carried out. (Return to processing for S1 described above again). On the other hand, if the result of determination processing in step S2 is that image data for a second or later frame has been read out from the imaging section 12 (Yes), the subsequent processing of steps S401-S51 or of steps S405-S52, and the processing of steps S7-S53, is executed in parallel in the image processing section 14.

First, operation for S3-S51 and S3-S52 will be described. With the processing of step S3, when an image that has been read out is of a second frame (Yes), then the pixel address extraction section 171 extracts bright pixel addresses for the image of the first frame. Specifically, pixel addresses for pixels that have outputs of a given threshold level or more are extracted (S401). Here, the threshold level may be designated by the photographer by means of the operation section 10, or may use an initial value that has been set beforehand within the camera. With the processing of step S401, extraction of bright pixel addresses involves, for pixel output data that has been arranged two dimensionally, for example, commencing examination from the most upper left pixel, and examining sequentially to the right. Then after examination of a first line has been completed, sequential examination is performed similarly for the next line from a left end pixel, and examination is performed for all pixels up until the right end pixel of the lowermost line, which is the final pixel address.

Further, if examination has been completed up to the final pixel address (S402 Yes), bright pixel addresses are extracted for the image data of the second frame using the same processing as in S401 and S402 (S403, S404). Next, for the respective image data of the first frame and the second frame, group allocation processing is carried out by the group allocation section 172 for the extracted pixel addresses (S51).

Figure 3:
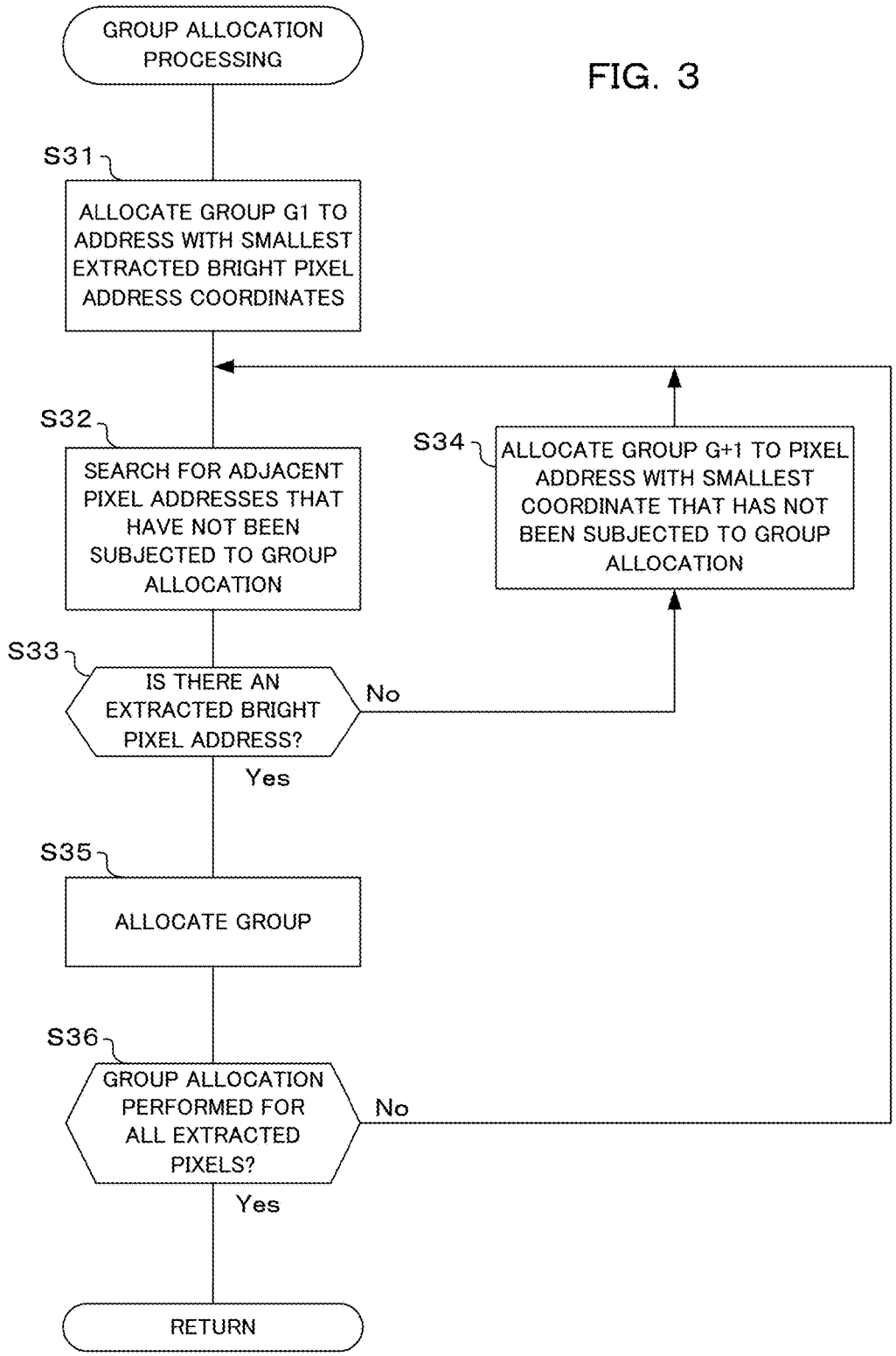
FIG. 3 is a flowchart showing an operating sequence for group allocation, in the camera of the first embodiment of the present invention.

Here, detailed operation sequence for the group allocation processing (S51) will be described using FIG. 3. First, group G1 is allocated to pixel addresses having extremely small coordinates, within the plurality of bright pixel addresses that have been extracted (S31). Specifically, for addresses having an extremely small X coordinate, when there are a plurality of pixels with the same X address, allocation processing is carried out with priority given to the addresses with a smaller y-coordinate. Next, for pixels that are diagonally adjacent to pixel addresses that have been allocated to group G1, a search is performed to detect whether there are extracted bright pixels for which group allocation has not yet been carried out (S32).

In the search processing of step S32, in the event that there is a bright pixel at an adjacent pixel (S33: Yes), this adjacent pixel is also allocated to the same group G1 (S35). The next process is determination processing as to whether or not bright pixels remain that have not been subjected to group allocation (S36). In this determination processing, in the event that there are bright pixels that have not been subjected to group allocation (S36: No), the processing of S32 is returned to again, and it is then examined whether there are bright pixels for which group allocation has not been carried out, for diagonally adjacent pixels to the bright pixels that have been allocated to G1 (S32).

In the examination processing of step S32, in the event that there is still a bright pixel for which group allocation has not been performed (S33: Yes), group G1 is allocated to that pixel address. On the other hand, if there are no adjacent pixels in the examination processing of S33 there is a transfer to processing to allocate group G2, as a new group, to pixel addresses, among bright pixel addresses for which group allocation has not been performed, having an extremely small X coordinate (following group G1, after groups G2 and Gm, Gm+1 is allocated (m is an integer of 1 or more)) (S34). For G2 also, similarly to for G1, it is examined, for adjacent pixels to the pixel addresses that have been allocated to G2, whether there are bright pixels that have not yet been subjected to group allocation.

In this way group allocation is carried out for all extracted bright pixel addresses. Once group allocation has been completed for all of the extracted bright pixel addresses (S36: Yes), group allocation processing is completed.

Figure 2:
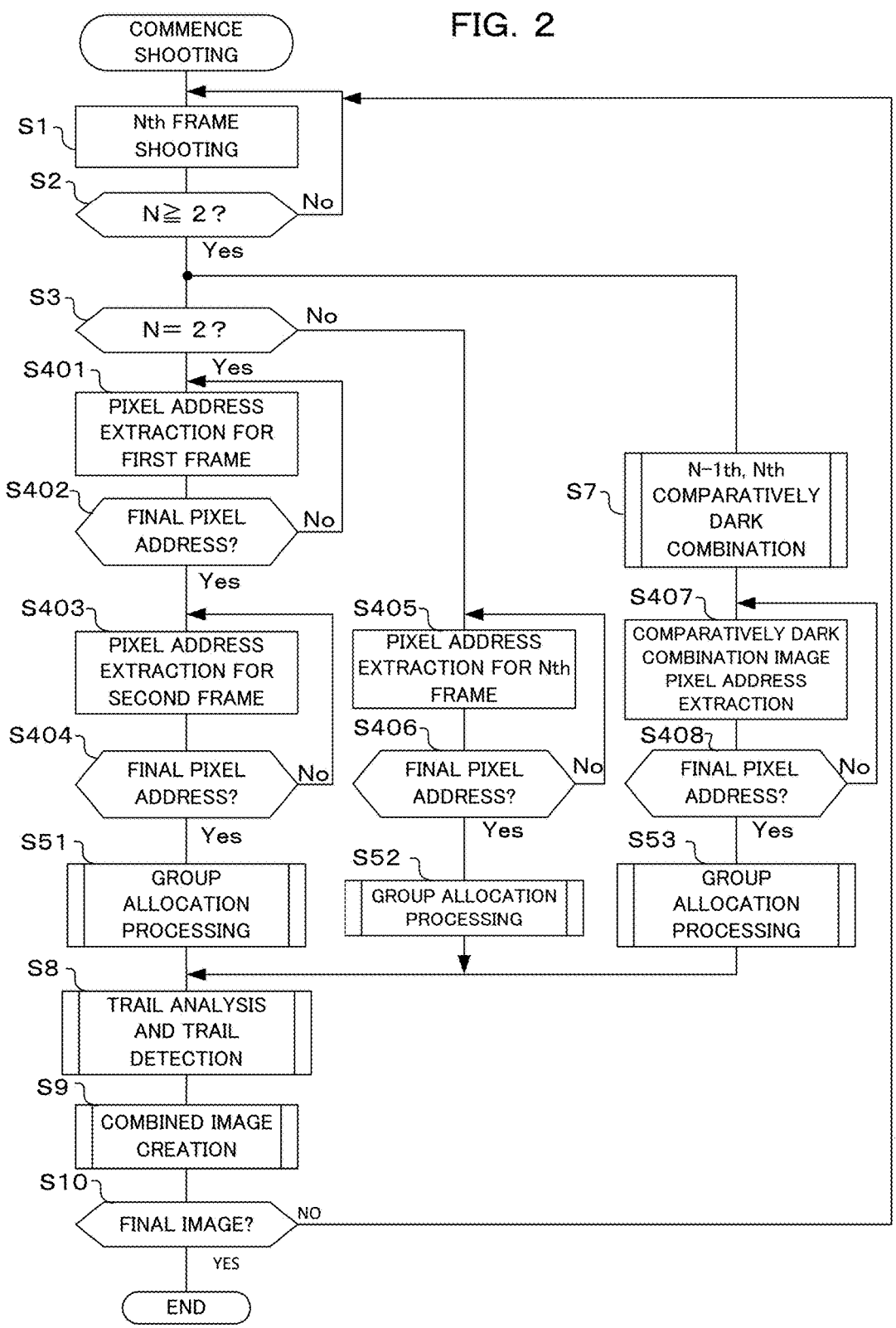
FIG. 2 is a flowchart showing an operating sequence of the camera of the first embodiment of the present invention.

Next, returning to the flowchart of FIG. 2, the sequence for steps S3-S52 will be described. In the case of processing for a third and subsequent frame (S3: NO), then for image data of a single frame that has been read out from the imaging section 12 (Nth frame image data), similarly to S403 to S51, bright pixels are extracted (S405), and group allocation processing is carried out for the extracted bright pixels (S52) (refer to FIG. 3).

Processing of S7-S53 which is executed in parallel with the processing of S3-S51 or S3-S52 will also be described. First, for read out image data of an Nth frame and read out image data of an N−1th frame, held in the image data storage section 151, image data is combined by the comparatively dark combination section 163 (S7).

Here, comparatively dark combination processing will be described. Comparatively dark combination is an image combination method wherein outputs for the same address in a plurality of image data to be combined are compared, and the smallest outputs are made pixel output after combination.

If pixel output of address (x, y) of image data of an Nth frame is made N(x, y), pixel output of address (x, y) of image data of an N−1th frame is made N−1(x, y), and pixel output of address (x, y) of combined image data after the image data of the Nth frame and the N−1th frame have been subjected to comparatively dark combination is made N_N−1 compD(x, y), then the comparatively dark combination processing is represented by expression (1) below.

$$N\_N-1 \text{compD}(x,y) = \min\{N(x,y), N-1(x,y)\} \quad (1)$$

Here, min{a,b} defines a function that outputs the smallest value of a numerical value A and a numerical value b.

Next, for the comparatively dark combination image N_N−1 compD(x, y), bright pixels are extracted by the pixel address extraction section 171 (S407). Specifically, pixel addresses for pixels that have outputs of a given threshold level or more are extracted. Here, the threshold level may use the same value as the value used in the processing of S401, S403 and S405, may use a value that has been designated by the photographer by means of the operation section 10, or may use a value that has been set beforehand within the camera.

Next, similarly to steps S402, S404, and S406, examination is commenced from the upper left of the image, and whether or not there are bright pixels is examined up to the lower right of the image, constituting the final pixel. Once examination is complete (S408: Yes), group allocation is carried out in the group allocation section 172 for bright pixels of the comparatively dark combination image N_N−1 compD(x, y), using the same method as was shown in S51, S52 and FIG. 3 (S53).

Next, for the image of the Nth frame and the comparatively dark combination image N_N−1 compD(x, y), each group that has been subjected to group allocation is made a light trail, movement velocity of the trails is analyzed by the trail analyzer 174, and trails that have fast movement velocity and trails that have slow movement velocity (including objects that are not moving) are detected by the trail detection section 173 (S8).

A specific method for the trail analysis and trail detection in step S8 will be described using FIG. 4. Here, for the image of the Nth frame, each of the groups that have been subjected to group allocation are defined as G1_N, G2_N, G3_N, G4_N, G5_N, . . . , Gm_N (m is an integer of 1 all greater, and N represents the Nth frame), and for the comparatively dark combination image for the Nth and N−1th frames, each of the groups that has been subjected to group publication are defined as G1_NcompD, G2_NcompD, G3_NcompD, . . . , Gl_NcompD (l is an integer of one or more).

First, in the case of processing for N=2, namely the second frame (S41: Yes), subsequent processing is carried out with either comparatively bright combination image data, resulting from combination of image data of the first frame and image data of the second frame by the comparatively bright combination section 161, or additively combined image data resulting from combination by the additive combination section 162, as the image data of the Nth frame (S42). In the case of processing for the third and subsequent frames (S41: No), image data of an Nth frame that has not been subjected to combination is processed. Next, groups other than those that have been classified into a low speed trail (S45) or a high speed trail (S46) in the processing of S44 that was carried out on image data up to the N−1th frame (groups that have not been classified) are detected from among the group of the image data of the Nth frame (S43).

Next, for pixel addresses included in an initial group G1_N of the Nth frame, the trail analyzer 174 analyzes whether any of pixel addresses of all of the extracted groups of the comparatively dark combination image (G1_NcompD to Gl_NcompD) are included (S44). Here, if an analysis result has been obtained that indicates that pixel addresses of an extracted bright pixel group are included in the comparatively dark combination image data (S44: Yes), it is detected by the trail detection section 173 that this group G1_N is a "low speed trail", which is a trail that moves at low speed (S45).

On the other hand, in the examination processing of step S44, in the event that is analyzed that pixel addresses of an extracted group of the comparatively dark combination image are not included (S44: No), it is detected by the trail detection section 173 that this group G1_N is a "high speed trail", which is a trail that moves at high speed (S46). The reason why a trail that moves at low speed or high speed is detected using this method will be described later.

Similarly, for the pixel addresses of the next group G2_N, it is examined whether any of pixel addresses of all the extracted groups of the comparatively dark combination image data are included (S44). This examination is executed for all groups of the Nth frame, and detected as either a "low speed trail" or a "high speed trail". If detection has been completed up to the final group of the Nth frame (S47: Yes), there is a transfer to the next process.

Next, for each group Gl image data of the Nth frame, it is examined as to whether or not it pixels are detected in a "high speed trail" (S48). In the examination processing of step S48, pixel addresses of a pixel group that was detected in a "high speed trail" (S48: Yes) are registered in the pixel address storage section 152 as replacement addresses of the Nth frame image data (S49).

On the other hand, a pixel group that is detected in a "low speed trail" in the examination processing of step S48 is not recorded specially, and the procedure moves on to an examination of the next pixel group (transfer to the processing of S410 and after). Details of this processing will be described later, but in the examination processing of S48 pixel addresses are registered in the pixel address storage section 152 for a light trail that has been detected in the "high speed trail" moving at high speed (trail of an aircraft or the like), as an object to be removed from the finally combined image. If the examination has been completed up to the final group of the image data of the Nth frame (S410: Yes), detection of trails is completed and the originating flow is returned to.

It should be noted that in a case where N=2, description has been given for processing with combined image data of the image data of the first frame and the second frame as the Nth frame image data, but trail analysis and detection processing may also be carried out respectively on image data of the first frame and the second frame, and replacement pixel addresses of respective image data may be registered.

Next, the reason for determining that there is a trail that moves at low speed if a group of comparatively dark combination image data is contained in image data of a frame will be described using FIG. 5A-FIG. 5D. For example, a case where a light trail of an aircraft (AP in image IM5a) is captured during shooting of star trails (ST in image IM5a) will be illustrated by example. Image IM5a and IM5b show images of an N–1th frame and an Nth frame that have been captured successively. Generally speaking, movement velocity of an aircraft is fast compared to movement of stars due to the rotation of the earth. Also, in the case of continuous shooting with a digital camera, an unexposed period arises where once shooting of an N–1th frame is completed shooting is not carried out until commencement of shooting for an Nth frame.

Specifically, there is an operation with a mechanical shutter closed once after completion of shooting of the N–1th frame, and the shutter is opened upon commencement of shooting of the Nth frame, namely there is a period in which shooting is not performed which lasts about 0.1 secs with the mechanical shutter closed, and this constitutes the unexposed period.

Here, image IM5d in which a portion where the trail of an aircraft that was captured in image IMdc is displayed enlarged, and an image IM5e in which a portion where a light trail of a star is displayed enlarged, are shown. Further, respective light trails captured in the N–1th frame and the Nth frame are displayed in image IM5d and image IM5e.

Firstly, with trail AP_N–1 of the aircraft captured in the N–1th frame and trail AP_N of the aircraft captured in the Nth frame, of image IM5d, since the aircraft moves quickly a portion where the trail is interrupted occurs between AP_N–1 and AP_N.

On the other hand in image IM5e, since movement of the stars is extremely slow, there is no interruption between the star trail ST_N–1 captured in the N–1th frame and the star trail ST_N captured in the Nth frame, and an overlapping portion ST_compD occurs. If image data of the N–1th frame and the Nth frame are subjected to comparatively dark combination, the trail of the aircraft is not captured since brightness of the night sky of the background is reflected instead, as shown in image IM5f.

On the other hand, regarding the star trails, a portion where the star trails of the N–1th frame and the Nth frame overlap (ST_compD) is depicted as a bright point. Regarding the star trails, at portions where the trails do not overlap brightness of the night sky of the background is reflected if comparatively dark combination is carried out. In this way, for star trails having slow movement velocity, overlapping portions of the trails are shown brightly if comparatively dark combination is carried out. On the other hand, light trails of aircraft having a fast movement velocity are not depicted.

Figure 4:
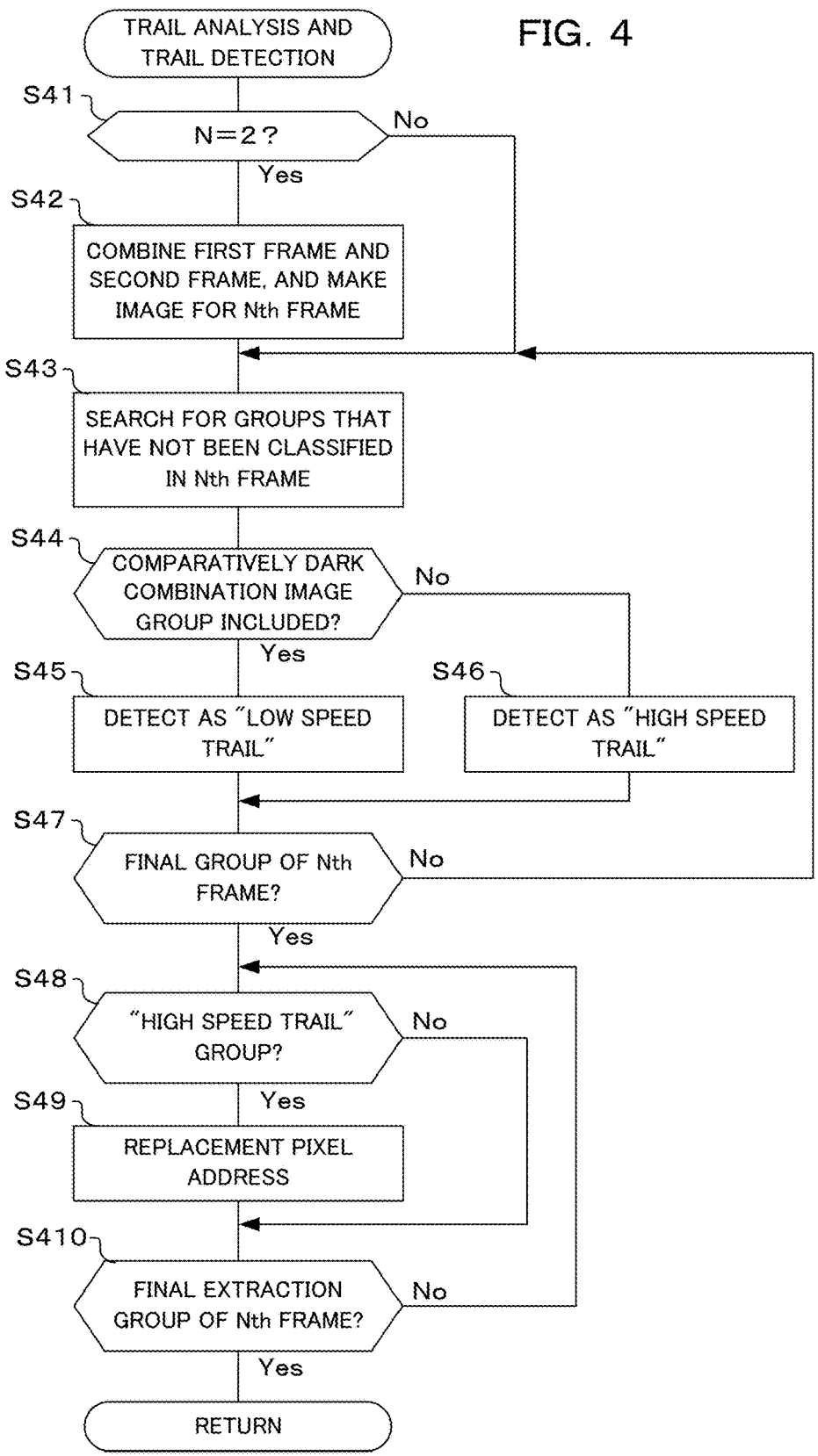
FIG. 4 is a flowchart showing an operating sequence for detecting a trail captured in an image, in the camera of the first embodiment of the present invention.
Figure 5A:
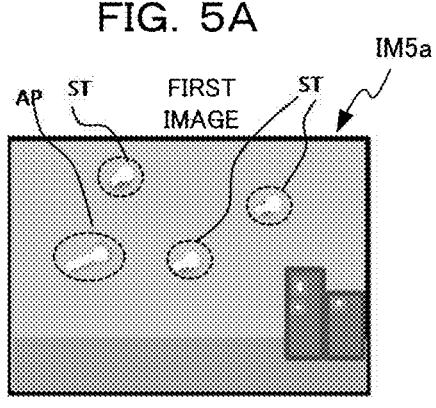
FIG. 5A-FIG. 5D are drawings for describing the principal of detecting trails, in the camera of the first embodiment of the present invention.
Figure 5B:
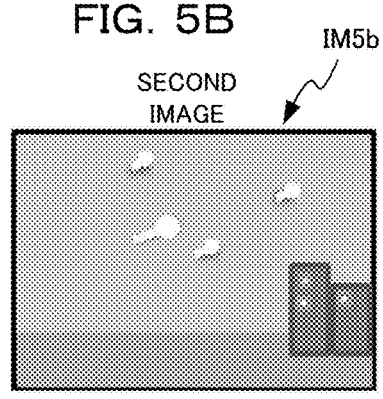
Figure 5C:
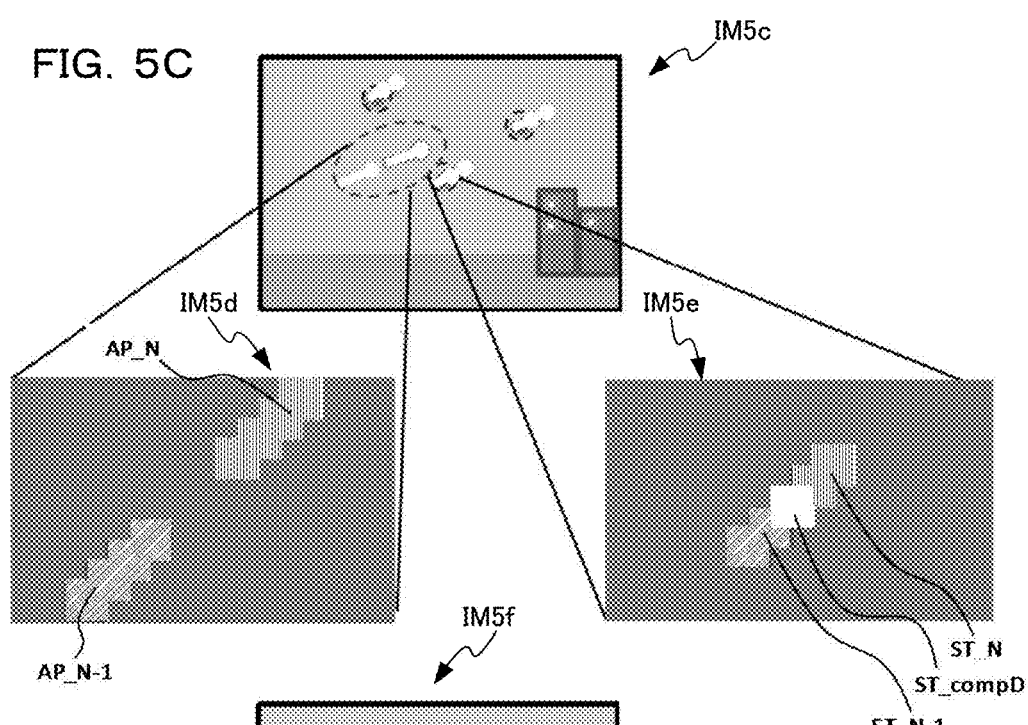
Figure 5D:
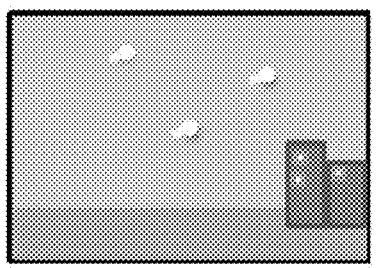

In the flowchart for trail detection that was shown in FIG. 4, utilizing this phenomenon, detection is performed with bright pixel groups, that contains a group of bright pixels in which comparatively dark combination image data is depicted (namely portions where trails overlap in the N–1th frame and the Nth frame), as trails that move at low speed (star trails and other bright objects that do not move), and other groups as trail that move at high speed (light trails of aircraft etc.).

If the flowchart show in FIG. 2 is again returned to, next combined image data that has been registered is prepared (S9 in FIG. 2). A detailed sequence of the processing for generating combined image data will be described using the flowchart shown in FIG. 6.

First, in the case of processing of image data of the second frame (S61: Yes), each pixel address of the first frame is compared with registered replacement pixel addresses for a combined image of the first frame and the second frame that have been stored in the pixel address storage section 152, and whether or not each pixel address matches the replacement pixel address (S621) is examined.

For a pixel for which the result of examination processing in step S621 is that both addresses match, in the pixel address replacement section 18 output of this pixel is replaced with output of the same pixel address of a comparatively dark combination image 1_2 compD(x, y) of the first frame and the second frame (S622). Next, if replacement has been completed for all replacement pixel addresses that have been registered in the pixel address storage section 152 (S623: Yes), then replacement of pixel output for replacement pixel addresses is also carried out for image data of the second frame, similarly to S621-S623 (S631-S633).

Once replacement for all replacement pixel addresses that have been registered in the pixel address storage section 152 has been completed (S633: Yes) there is a transfer to the next process. Image data of the first frame and image data of the second frame, that have had pixel output replaced, is combined (S65). Combination here is combination processing in order to leave behind a combined image of a light trail, and involves additive combination processing using the additive combination section 162 and comparatively bright combination processing using the comparatively bright combination section 161. Details of the combination method will be described later. If combination is complete, combined image data is stored in the image data storage section 151 as cumulatively combined image data, and will be used in combination with the next frame (N=3).

Next, processing when the result of determination in step S61 is N≥3, namely for a third or subsequent frame (S61: No), will be described. A comparison is performed as to whether or not each pixel address of the Nth frame matches a replacement pixel address for the Nth frame that has been stored in the pixel address storage section 152 (S641). If the result of this comparison processing is that both addresses match, in the pixel address replacement section 18 output of this pixel is replaced with output of the same pixel address of a comparatively dark combination image N_N–1 compD (x, y) of the Nth frame and the N–1th frame (S642).

Once replacement for all replacement pixel addresses that have been registered in the pixel address storage section 152 has been completed (S643: Yes) there is a transfer to the next process. Image data of the Nth frame that has been subjected to pixel output replacement, and cumulatively combined image data from the first frame to the N–1th frame that has been saved in the image data storage section 151, are combined (S66). The combination here is additive combination or comparatively bright combination, similarly to step S65. If combination is complete, combined image data is saved in the image data storage section 151 as cumulatively combined image data, and will be used in combination with the next frame (N+1).

Here, details of the additive combination and the comparatively bright combination will be described. Additive combination is a combination method whereby output, that is derived by adding pixel output for the same addresses in a plurality of image data, is made pixel output after combination, and is processing that makes the overall image, including brightness of the background, brighter each time combination is performed. Comparatively bright combination can adjust brightness of an overall image together with length of light trails by regulating a number of images to be combined.

Specifically, if pixel output of address (x, y) of image data of an Hth frame is made H(x, y), and pixel output of address (x, y) of additively combined image data for an H−1th frame and an Hth frame is made H_H−1compS(x,y), the additive combination is represented by equation (2) below.

$$H\_H-1\text{comp}S(x,y)=H-1(x,y)+H(x,y) \quad (2)$$

Comparatively bright combination is a combination method whereby magnitudes of pixel outputs of the same address in a plurality of image data to be combined are compared, and the larger output is made pixel output after combination. If combination processing for comparatively bright combination is used, if each frame before combination is taken at the same exposure, brightness of a background portion for which brightness does not change in each frame stays as it is, even if the number of frames to be combined is increased, and only light trails are extended. With this combination processing, differing from the additive combination, there is a combination method that can shoot light trails of a desired length without being concerned about background brightness.

Specifically, if pixel output of address (x, y) of comparatively bright combination image data for an Hth frame and an H−1th frame is made H_H−1compB(x,y), the comparatively bright combination is represented by equation (3) below.

$$H\_H-1\text{comp}B(x,y)=\max\{H-1(x,y),H(x,y)\} \quad (3)$$

max{a,b} defines a function that makes the larger of a numerical value a and a numerical value b the output.

A control program is stored in the memory 15 in the camera so that the photographer can set whether to carry out additive combination, to carry out comparatively bright combination or to carry out both at the same time in parallel, as the combination processing procedure, by means of the operation section 10.

In this way, until combination is carried out for an Nth frame, image combination is carried out for sets of image data for which replacement of replacement pixel addresses has been carried out (S622, S632, S642) for respective image data in the first frame up to the N−1th frame. As a result of this processing, cumulatively combined image data from a first frame to an N−1th frame, and image data of an Nth frame (which has been subjected to replacement of replacement pixel addresses) are combined, to create combined image data for from the first frame to the Nth frame (S65, S66). If combination has been completed, the resulting data is stored in the image data storage section 151 as cumulatively combined image data for from the first frame to the Nth frame (this cumulatively combined image data will be used for combination with the subsequent N+1th frame).

Here, as storage of image data to the image data storage section 151, only combined image data for from the first frame to the Nth frame may be stored, or respective image data for from the first frame to the Nth frame and respective combined image data arising during combination may be stored together.

For example, if respective image data from the first frame to the Nth frame are saved in the image data storage section 151, it is possible to perform combination by selecting desired image data after completion of shooting, which means that it is possible to create combined image data that the photographer wants. So, if image data during combination are stored it is possible to select combined image data for trails of a desired length after shooting. On the other hand, in the case of storing only combined image data for from the first frame to the Nth frame, it is possible to reduce the data amount that is stored in the memory, and there is no problem such as, for example, memory capacity becoming insufficient during the course of shooting.

Also, in steps S622, S632 and S642 in FIG. 6, description has been given for a method whereby pixel output for replacement pixel addresses are replaced with outputs of comparatively dark combination image data, but it is also possible to carry out replacement with output of averaging combination image data that has been combined by the averaging combination section 164. Averaging combination is a combination method whereby average values of pixel outputs for the same addresses in a plurality of image data that are to be subjected to averaging combination are made pixel outputs after combination.

Specifically, if pixel output of address (x, y) of averaging combination image data for an Hth frame and an H−1th frame is made H_H−1compA(x,y), the averaging combination is represented by equation (4) below.

$$H\_H-1\text{comp}A(x,y)=\text{ave}\{H-1(x,y),H(x,y)\} \quad (4)$$

ave{a,b} defines a function that makes an average value of a numerical value a and a numerical value b the output.

By replacing with average outputs of the Nth frame and the N−1th frame, it is possible to replace with output that is closer to the background brightness than a light trail, and so it is possible to prevent light trails of aircraft becoming prominent, and there is the effect of removing light trails of aircraft from a combined image, similarly to with a comparatively dark combination image. For example, in a case where it is necessary to construct a digital camera with an image combination section 16 that uses a non-rewritable IC for internal circuitry such as an ASIC (Application Specific Integrated Circuit), and further, in cases such as where the ASIC used handles averaging combination processing but not comparatively dark combination, it becomes possible to carry out replacement processing for replacement pixel addresses using averaging combination processing that is provided in the ASIC.

Once the above-described combination has been completed (S9 in FIG. 2), if shooting is not completed (S10: No) the same processing (processing from S1 to S9) is carried out for image data of the N+1th frame, which is the next image. If the photographer completes shooting by means of an operation (S10: Yes), shooting and image combination processing are terminated upon completion of processing of the image of the Nth frame.

Description of the Effect of the First Embodiment

In this way, with this embodiment, it is possible to detect light trails that move at high speed and light trails that move at low speed depending on movement velocity of the light trails. Also, by replacing pixel addresses in a detected light trail that correspond to a light trail that moves at high speed with background brightness it is possible to remove trails that move at high speed from combined image data.

It should be noted that while description has been given for a method that removes trails of aircraft that move at high speed in this embodiment, this is not limiting and it is also possible to remove low speed light trails from the combined image data. In this way it is possible, for example, to remove light trails of stars and lights that do not move (building lights), and it is possible to satisfy the photographers demand in wanting to capture only light trails of aircraft that move at high speed in the combined image data. In this case, in the processing from step S45 to S46 in FIG. 4, pixel addresses of a group that has been detected in a "low speed trail" (S45: No) are registered in a replacement pixel address (S46), and replacement processing may be carried out to remove the "low speed trail" from the combined image.

Also, with this embodiment, description has been given of a method that detects trails and carries out combination processing every frame. By carrying out combination processing every frame, for example, the photographer can confirm shooting progress while shooting by displaying interim image data for combination as shooting progress on the display section 11, but this is not limiting.

For example, using comparatively dark combination image data for I frames every I frames (I is an integer of 2 or more, for example), detection of trails for I frames of comparatively bright combination image data or for additively combined image data is carried out, and replacement of pixel addresses may be carried out. In so doing, compared to carrying out processing every one frame, since it is possible to reduce the number of times processing is carried out it is possible to reduce the number of times each section within the digital camera is driven to thus reduce battery consumption, and in a case where processing can not be carried out because detection processing and image combination processing encounters a problem in processing for continuous shooting (an N+1th frame is read out before completion of combination processing for an Nth frame, and so processing of the N+1th frame is missed), it is possible to handle processing in time.

It is also possible to make I the total number of frames that have been shot. In this case, when shooting of all frames has been completed, trails are detected using comparatively dark combination image data, and comparatively bright combination image data or additively combined image data of all frames, and similar results are achieved by carrying out replacement processing for pixel addresses with a reduced number of times processing is executed.

Also, although with this embodiment a method for detecting aircraft and other trails (low-speed movement trails such as stars, or lights that are not moving, such as building lights) has been described, this embodiment may also be applied to detection of various other light trails. For example, since shooting interval for an N−1th frame and an Nth frame can be changed using a camera control program, if the method of this embodiment is used for images of a plurality of frames that have been taken by adjusting shooting interval in accordance with differences in movement speeds of lights it is desired to detect, it is possible, for example, to detect star trails and firework trails, and this embodiment can also be applied to detection of firefly trails and star trails etc. Similarly, it is possible to achieve the same effect as when performing continuous shooting with a long shooting interval, even if detection of trails is carried out using image data of an N−1th frame and an N+1th frame, for example, Also, while with this embodiment description has been given for a method of removing unnecessary trails from additive combination and comparatively bright combination image data in which trails have been captured, this is not limiting, and pixels may also be replaced so as to add required light trails to averaging combination image data and comparatively dark combination image data in which light trails have not been captured. In this case, a group of pixels for required light are stored as replacement pixel addresses, and it possible to realize the desired effect by replacing the replacement pixel addresses with outputs of pixel data that has been generated by addition or comparatively bright combination.

Also with this embodiment, although, among the groups of light trails that have been detected, a group of pixel addresses of a "low speed trail" is stored as replacement pixel addresses, this is not limiting, and pixel addresses of a trail group of other than a "low speed trail" may also be stored in the pixel address storage section 152 separately to a group for a "low speed trail". In so doing it becomes possible to remove a desired trail group from a combined image in accordance with determination by the photographer after shooting, and to generate combined image data in line with various intentions of many photographers.

Also with this embodiment, regarding bright pixels that have been extracted by the pixel address extraction section 171, although description has been given of a method of processing a group of adjacent pixels in the group allocation section 172 as a single group, this is not limiting. A general image sensor that is used in a digital camera is provided with a Bayer array having color filters on R (red), G (green), and B (blue) photodiodes arranged alternatively (respective R pixels, G pixels and B pixels). Color filters for each RGB color have different sensitivity depending on the color of a subject, and so bright pixels may be extracted by the pixel address extraction section 171 at different threshold levels for every R pixel, G pixel and B pixel. Also, in the group allocation section 172, groups may be made by putting a group of adjacent pixels for every pixel having the same color filter into R pixel, G pixel and B pixel, as a single group. By doing this, even in a case where trails of green light (fireflies etc.) have been shot, G pixels are extracted as bright pixels, but for the R pixels and B pixels that have not been detected as brightness pixels because of their small output, it becomes possible to carry out group allocation as a correct light trail. It is also possible to achieve the same effect even if bright pixel extraction is carried out for brightness value of each pixel after demosaicing processing, for example.

Second Embodiment

An example where an image processing device of a second embodiment has been applied to a digital camera will be described in the following with reference to the attached drawings. It should be noted that description for structure and processing that is the same as in the first embodiment is omitted.

Structural Description of the Second Embodiment

Figure 7:
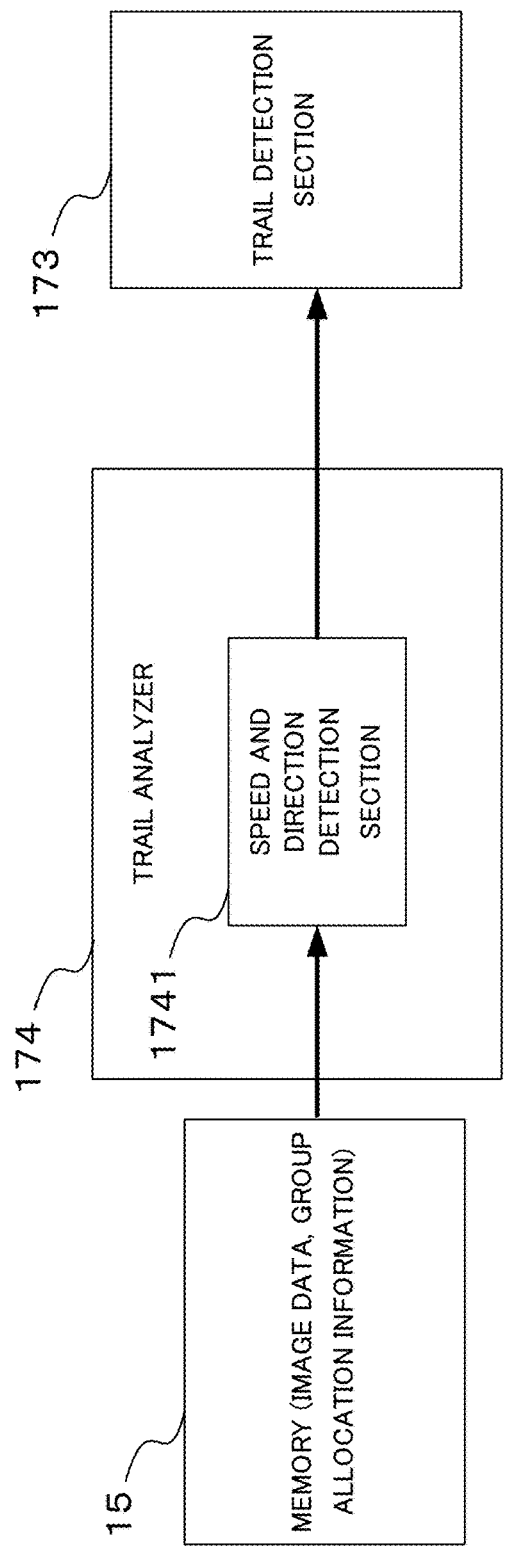
FIG. 7 is a drawing showing the structure of a trail analyzer of a camera of a second embodiment of the present invention.
Figure 8:
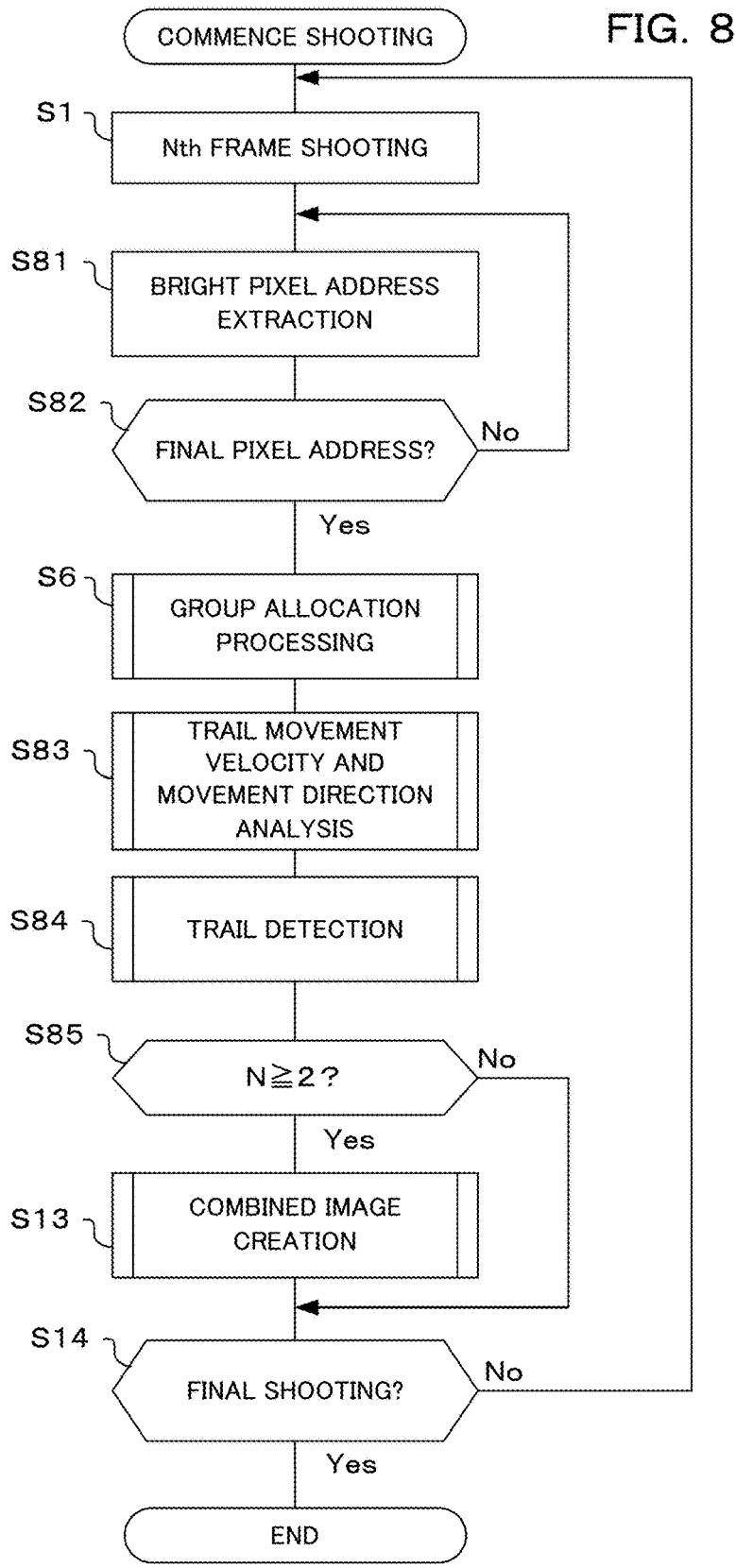
FIG. 8 is a flowchart showing an operating sequence of the camera of the second embodiment of the present invention.

First, the structure of a digital camera of the second embodiment will be described using FIG. 7. In this embodiment, a speed and direction detection section 1741 is provided in the trail analyzer 174. Detailed operation will be described later, but the speed and direction detection section 1741 analyzes information such as movement velocity and movement direction of light trails that have been captured in image data. In this embodiment, trails are detected by the trail detection section 173 based on the results of this analysis. Remaining structure is the same as that of the first embodiment.

Operational Description of the Second Embodiment

Next, function and operation of a digital camera of this embodiment will be described using FIG. 8 to FIG. 11. First the operating sequence will be described using FIG. 8. With this embodiment, similarly to the operation of the first embodiment (flowchart of FIG. 2), image data of a plurality of successively taken frames are sequentially combined. This embodiment differs from the first embodiment in that processing to analyze speed and direction of a trail (S83), shown in later discussion, is included.

First, if an image is read out from the imaging section 12 (S1), then similarly to the first embodiment bright pixels of a given threshold or higher are extracted for each pixel output (S81). If extraction has been completed for all pixels (S82: Yes), in the group allocation section 172 a group of associated pixels adjacent to the extracted bright pixel addresses is allocated (S6).

Figure 9:
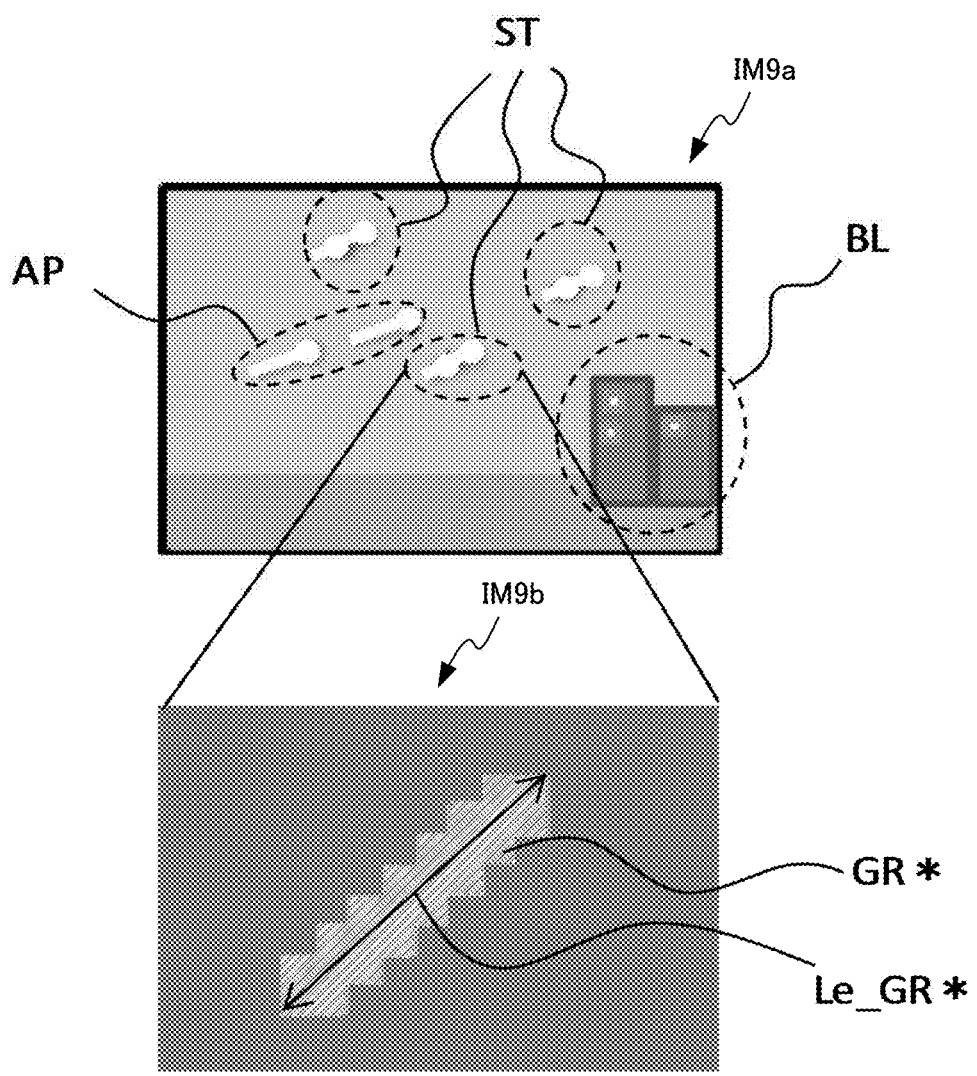
FIG. 9 is a drawing for describing a method of analyzing trails, in the camera of the second embodiment of the present invention.

Once group allocation has been completed for all pixels, movement velocity or movement direction is analyzed for each group in the speed and direction detection section 1741 (S83). Specifically, for a bright pixel group GR* (* is an integer of 1 or more representing a group number) such as shown in FIG. 9, for example, this analysis processing quantifies a length of that group Le_GR* as trail movement velocity. This quantification is carried out for all groups, statistical processing is applied, and a frequency of occurrence with respect to speed of the trail is made into a histogram, as shown in FIG. 10A, with the longer trail lengths indicating trails of faster movement velocity.

Figure 10A:
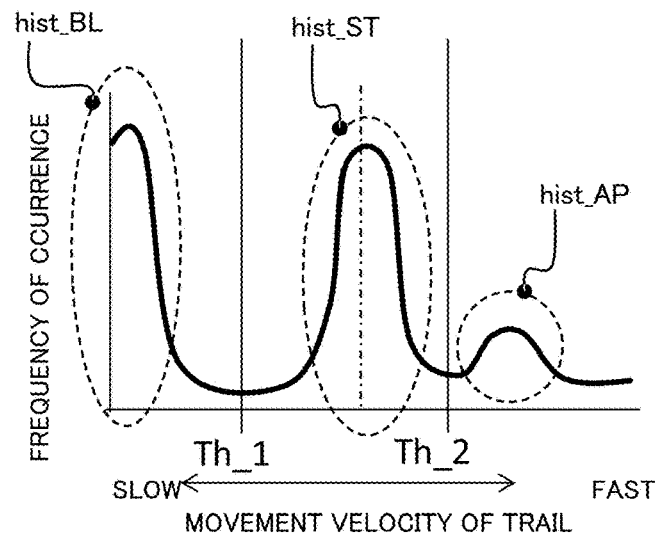
FIG. 10A-FIG. 10C are drawings showing effects of trail analysis, in the camera of the second embodiment of the present invention.

Here, for example, if a plurality of groups of bright pixels such as star trails ST, aircraft trails AP, lights of building windows BL etc. are captured in an image, as shown in FIG. 9 (only a few objects are shown in FIG. 9, but in reality there are numerous building lights, stars and aircraft), then in a histogram such as that in FIG. 10A high brightness regions that differ in length in accordance with movement velocity of a trail are generated, such as small brightness points like building windows hist_BL, star trails hist_ST that are longer (moving faster), and aircraft trails Hist_AP that are even longer trails (moving faster still).

Figure 11:
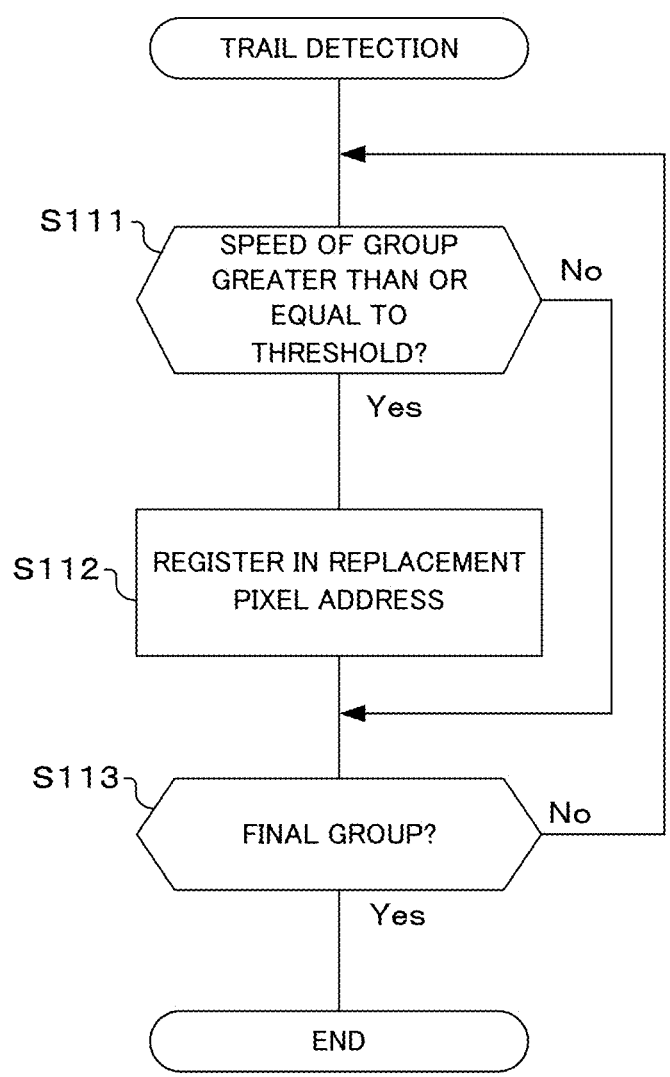
FIG. 11 is a flowchart showing an operating sequence for detecting trails, in the camera of the second embodiment of the present invention.

Next, detection of trails is performed by the trail detection section 173 for each group that has been analyzed (S84). If a threshold Th_1 is set between lengths at which frequencies of occurrence of building window bright points and star trails become maximum in FIG. 10A, and a threshold Th_2 is set between lengths at which frequencies of occurrence of star trails and aircraft trails become maximum, then group shorter than Th1: small bright point such as building (fixed trail)

group of length greater than Th1, less than Th2: star trail (trail that moves slowly)

group longer than Th2: aircraft trail (trail that moves quickly)

can be detected. Here, Th1 and Th2 may use values that have been set beforehand in the camera, or may use values that have been arbitrarily set by the user by means of the operation section 10. For example, the histogram of FIG. 10A may be displayed on the display section 11, and the user may designate Th1 and Th2 while looking at the histogram distribution, Detection processing that is carried out by the trail detection section 173 in step S84 uses these threshold levels, and detects trails. A specific processing sequence for S84 is shown in the flowchart of FIG. 11.

First it is determined whether or not movement velocity (length) of group G*_N is greater than or equal to a given threshold level (S111). In the determination processing of step S111, if the length of the group G*_N is greater than or equal to, for example, Th2 (S111: Yes), processing to register the pixel address of the group G*_N as a replacement pixel address is performed (S112). On the other hand if, in the determination processing of step S111 the length of the group G*_N is less than, for example, Th2 (S111: No), there is a transfer to the next determination processing step (S113) without processing to register that group in a replacement pixel address. With the determination processing of step S113, it is determined whether or not registration has been completed for all groups, and if registration has been completed for all groups (S113: Yes), detection of trails is completed.

In this way, once detection of trails that have been captured in image data has been completed (S84 in FIG. 8), combined image data is created (S13). Regarding processing to create the combined image data in step S13, for example, similarly to the first embodiment, in the case of removing aircraft trails, a group of pixel addresses having length corresponding to hist_AP in FIG. 10A of greater than or equal to Th_2 is stored in the pixel address storage section 152 as replacement pixel addresses, and by carrying out the same pixel replacement and combination processing as in the first embodiment (S9 processing in FIG. 2 and processing of FIG. 6) it is possible to create combined image data that has had aircraft trails removed.

Description of the Effect of the Second Embodiment

Therefore, with this embodiment, for a group of bright pixels information such as movement velocity (length) and direction of that group is detected and statistical processing is carried out. Groups are detected using statistical distribution based on the results of the statistical processing, and using the results of detection is possible to remove some light trails from a combined image.

It should be noted that with this embodiment, description has been given of a method that detects trails and carries out combination processing every frame, but similarly to the first embodiment, this is not limiting. For example, using comparatively dark combination image data for I frames every I frames (I is an integer of 2 or more, for example), detection of trails for I frames of comparatively bright combination image data or for additively combined image data is carried out, and replacement of pixel addresses may be carried out.

It should be noted that in this embodiment description has been given of processing for making analysis results for trails into a histogram, but a taken image and a created histogram may be displayed on the display section 11, and the photographer may be able to change values of threshold levels for detecting trails to arbitrary values by means of the operation section 10. Further, trails that are greater than or equal to, or less than or equal to, a threshold level may be displayed on the display section 11 using flashing display etc., making it possible to confirm what type of trail has been captured in an image. By doing this, detection of trails as intended by the photographer becomes possible.

Also, with this embodiment, an example has been shown where two values (Th1, Th2) have been set for threshold levels, as one example. However, it may be possible to set many threshold levels, not only the two values. Doing this makes it possible to detect fine trails.

Figure 10B:
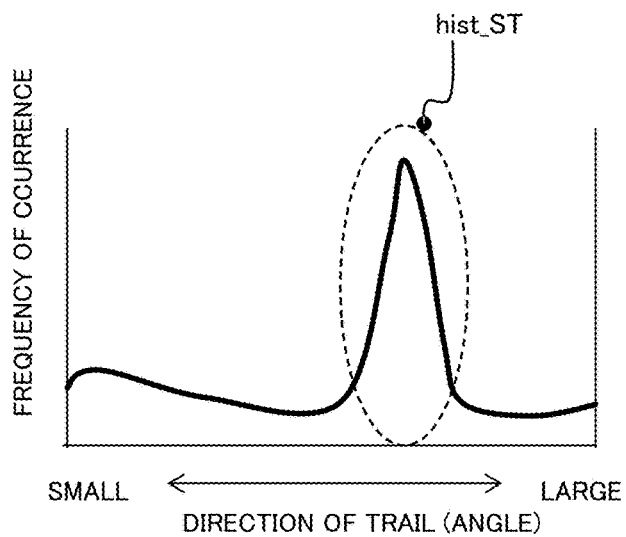

Also, although description has been given of a method for detecting using movement velocity (length) of each group, detection may also be carried out based on movement direction of each group, as in FIG. 10B, for example. When a camera is facing North, stars move in various directions around the north star, but when taking pictures facing in another direction, movement trails of stars move in roughly the same direction, and so it also becomes possible to extract moving trails of stars by detecting groups in a given directional range.

Figure 10C:
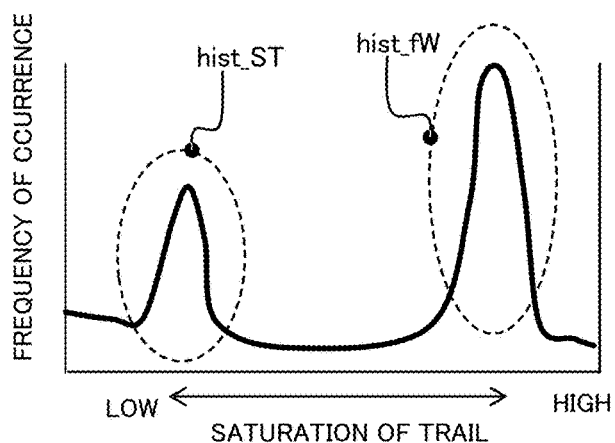

Also, in addition to length and direction of the trail, detection may also be carried out using saturation of a trail (color length), as in FIG. 10C. For example, light trails of fireworks and fireflies tend to have higher saturation than those of stars and aircraft, and so in the case where stars and fireworks have been photographed at the same time a star distribution and a firework distribution can be detected as hist_ST and hist_fw. It should be noted that besides saturation, detection may also be performed by making histograms from color and brightness distributions of pixels that are included in each group. Shooting and combination of various light trails of stars and fireworks, aircraft, fireflies and others can be envisaged, and so by doing this it becomes possible to detect these various light trails.

It is also perfectly possible to detect trails on the basis of not only one of the above described length, direction, saturation or color etc. of trails, but using two or more items of information. Doing this makes it possible to detect finer trails.

It should be noted that with this embodiment processing has been shown in which detection is carried out for trails that have been captured in image data of one frame that has been read out from the imaging section 12, but processing may also be applied that detects the same trails in combined image data that has been subjected to additive or comparatively bright combination processing. If shutter speed is fast then the movement amount of star trails on the image plane becomes small if shooting is carried out with a short focal length lens, and there may be situations where it is difficult to detect trails separately from small bright points of building windows etc., as illustrated. If there is a combined image of a number of frames, it is possible to capture long star trails, and so it is possible to improve the precision of detecting these small bright points.

Figure 12:
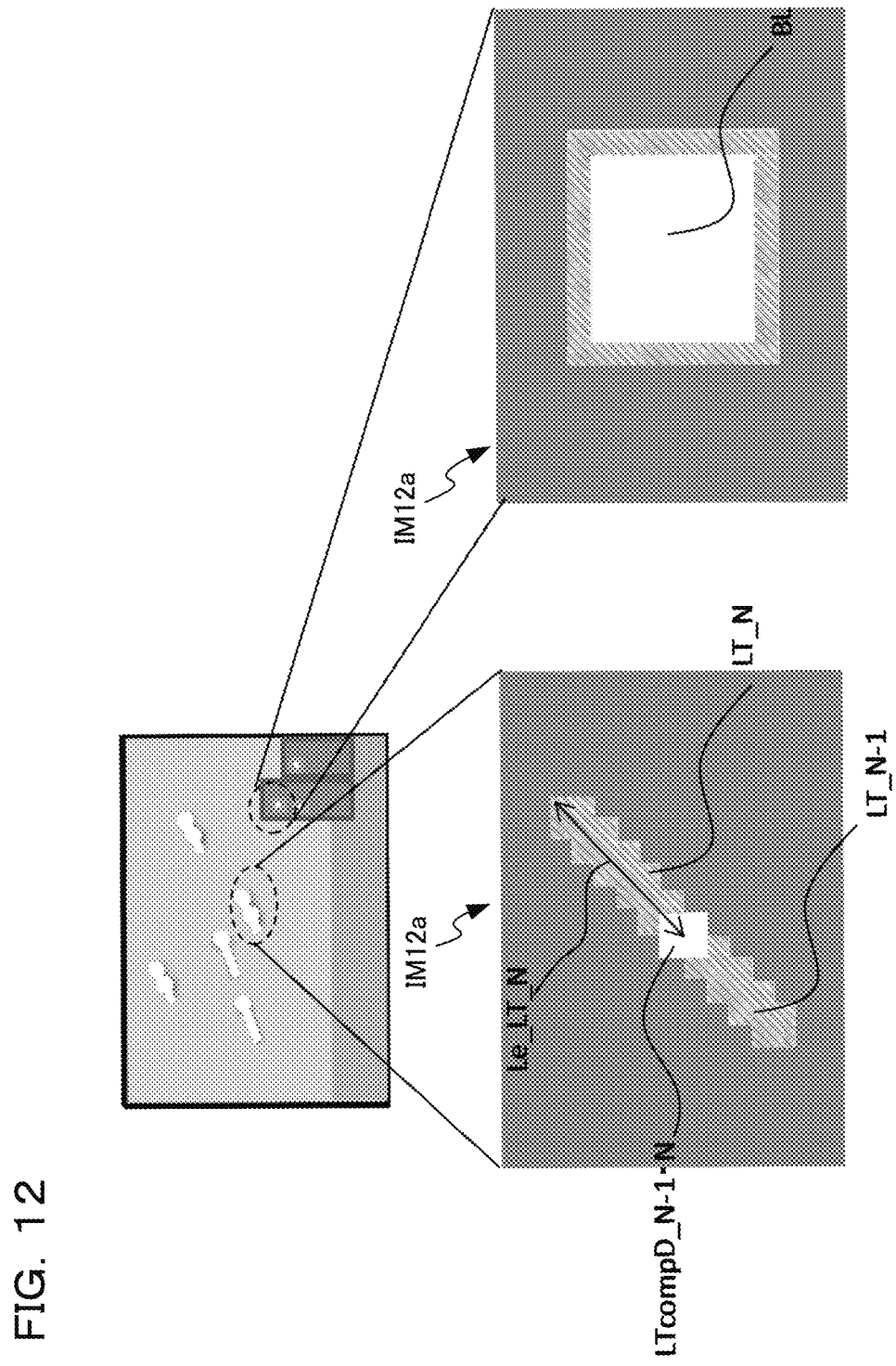
FIG. 12 is a drawing showing a modified example of a method of analyzing trails in the camera of the second embodiment of the present invention, and the effects of that analysis.

With this embodiment a method has been described for grouping trails of a single frame of image data, and trails of the above described combined image data that has been subjected to additive or comparatively bright combination, and detecting movement velocity (length) of the groups, but detection of trail length may also be detected using, for example, comparatively dark combination image data of image data of an N−1th frame and an Nth frame, as shown in FIG. 12.

Operation for detecting trail length using a comparatively dark combination image is shown in the following. For example, if light trail LT_N−1 of the N−1th frame and LT_N of the Nth frame, that move slowly like a star etc. are subjected to comparatively dark combination, as shown in image IM12a, only an overlapping portion LTcompD_N−1·N remains bright, and other portions become the same brightness as the night sky of the background. Here, by making pixel addresses of LTcompD_N−1·N an endpoint, and detecting length to a pixel that is furthest from LTcompD_N−1·N, using pixel addresses that do not include LTcompD_N−1·N but are included in LT_N, it is possible to obtain length Le_LT_N of the light trail LT_N of the Nth frame.

On the other hand, image IM12b shows a group of bright pixels BL of a building or the like that does not move. This group BL is photographed brightly without moving in the N−1th frame or the Nth frame, and so brightness does not change significantly even if comparatively dark combination is performed. That is, for the group BL, and pixels adjacent to this group, there is no extraction with comparatively dark combination image data, and since there are no extracted pixels in image data of the Nth frame, length of the trail becomes 0, and it is possible to detect that there is a group of bright pixels that do not move.

By detecting groups using this type of method, it is possible to perform detection for bright pixel groups that do not move, as well as bright pixel groups that move. By using this trail analysis method in combination with the method of the first embodiment or the above described second embodiment, it becomes possible to detect lights that do not move (for example, streetlights and lights of buildings that have been captured as the background), light trails that move at low speed (stars, fireflies), and light trails that move at high speed (aircraft and man-made satellites), as well as fine light trails.

Figure 13:
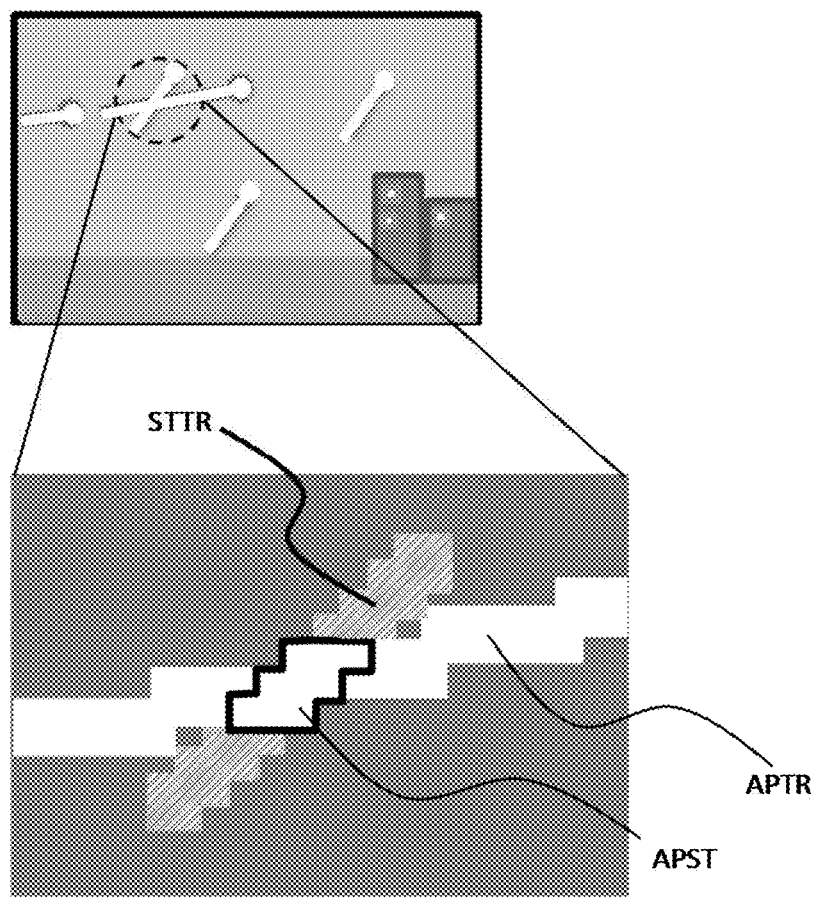
FIG. 13 is a drawing showing a modified example of a method for trail detection and image combination in the camera of the second embodiment of the present invention.

It should be noted that in a case where a light trail of an aircraft APTR and a light trail of a star STTR overlap, as in FIG. 13, with the image combination method of the first and second embodiments pixel replacement is carried out so as to remove the trail of the aircraft which means that an overlapping portion APST of the star trail and the aircraft trail is removed resulting in the star trail being broken. In this type of situation, by not registering pixel addresses of the star trail as replacement pixel addresses in the pixel address registration section 152, even if they are pixel addresses of the aircraft, it is possible to prevent the start trail being broken.

It should be noted that while, with this embodiment, description has been given for a method of removing unnecessary trails from additively combined image data and comparatively bright combination image data in which trails have been captured, this is not limiting, and pixels may also be replaced so as to add required light trails, for averaging combination image data and comparatively dark combination image data in which light trails have not been captured. In this case, a group of pixels for required light are stored as replacement pixel addresses, and it possible realize the desired effect by replacing the replacement pixel addresses with outputs of pixels that have been subjected to additive or comparatively bright combination.

Third Embodiment

An example where an image processing device of a third embodiment has been applied to a digital camera will be described in the following with reference to the attached drawings. With the third embodiment, movement velocity and movement direction of star trails captured in a taken image are calculated on the basis of information that has been detected by GPS or the like at the time of shooting, and trails are detected by analyzing whether light trails captured in an image are stars or other than stars. It should be noted that description for structure and processing that is the same as in the first and embodiments is omitted.

Structural Description of the Third Embodiment

Figure 14:
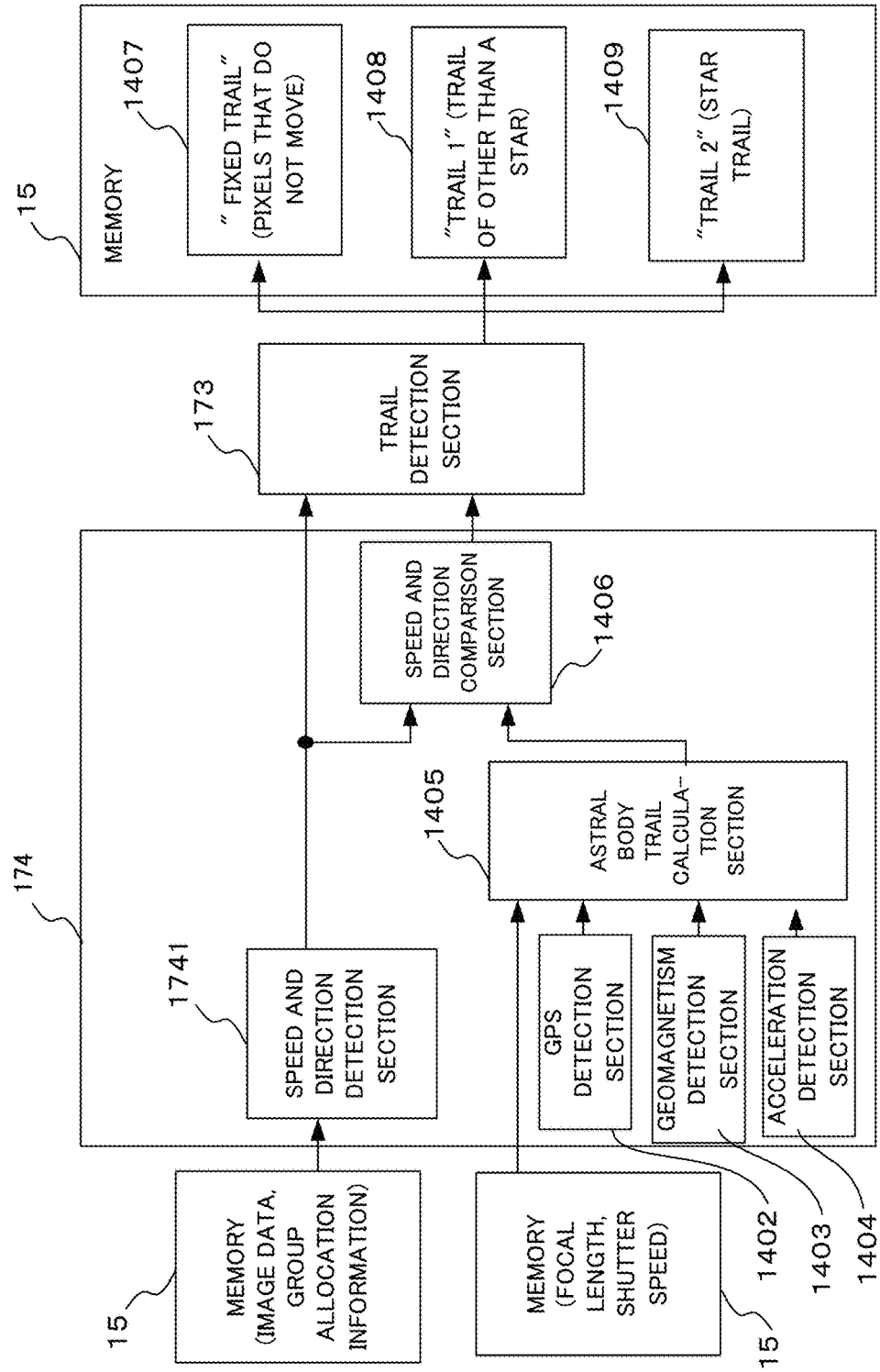
FIG. 14 is a drawing showing the electrical structure of a trail analyzer, a trail detection section and a memory, in a third embodiment of the present invention.

The basic structure of the digital camera of the third embodiment is the same as that of the first and second embodiments, but differs in the structure and function of the trail analyzer 174. The internal structure of the trail analyzer 174 of the third embodiment will be described using FIG. 14.

The trail analyzer 174, similarly to the second embodiment, has image data that has been stored in the memory 15, and address information of pixels that have been subjected to group allocation, input to the speed and direction detection section 1741. The speed and direction analyzer 1741 detects speed (length) and direction of each group using the same method as in the second embodiment. The detected information on speed (length) and direction of each group is sent to a speed and direction comparison section 1406 within the trail analyzer 174, and to the trail detection section 173. The trail analyzer 174 is also provided with a GPS detector 1402, a geomagnetism detector 1403, an acceleration detector 1404, and an astral body trail calculation circuit 1405.

The GPS detector 1402 is a receiving unit for GPS (global positioning system) information, and detects latitude information of the camera at the time of shooting and outputs to the astral body trail calculation circuit 1405. The geomagnetism detector 1403 is a geomagnetism sensor, and outputs information regarding which direction the camera is facing at the time of shooting to the astral body trail calculation circuit 1405. The acceleration detector 1404 is provided with an acceleration sensor, and outputs information as to which direction the camera is facing in at the time of shooting with respect to the direction of gravitational force (vertical direction), using a value and direction of gravitational acceleration detected by the acceleration sensor, to the astral body trail calculation circuit 1405.

The astral body trail calculation circuit 1405 calculates in which direction a star is moving within the image field of view, from these items of information, namely latitude, and direction in which the camera is moving and direction in which the camera is facing (north, south, east or west, and vertical direction), at the time of shooting. The astral body trail calculation circuit 1405 also calculates length and direction of a star's movement on the image plane, namely in image data that has been taken, by obtaining focal length of a lens and shutter speed from the memory 15 as shooting information at the time of shooting. In this way, length (movement velocity) and movement direction of stars in a taken image are calculated.

Next, results of calculation are input to the speed and direction comparison section 1406, and whether or not each group corresponds to a star trail is output by comparing information on speed and direction of a group for a light trail that has been captured in an image with movement direction and speed of movement of a star in an image that has been calculated by the astral body trail calculation circuit 1405. This output result is input to the trail detection section 173. In the trail detection section 173, each group is detected by adding results, which is information detected by the speed and direction detection section 1741, as to whether each group's trail is for a trail that does not move, for a trail that moves at low speed or for a trail that moves at high speed, and results obtained from the speed and direction comparison section 1406 as to whether each group corresponds to a star trail or not.

As a specific detection method carried out by the trail detection section 173, for example, first a group that has been detected as corresponding to a star trail is detected as in "trail 2" (1409 in FIG. 14), and for trails other than stars, on the basis of results from the speed and direction detection section 1741, a group of bright pixels that do not move is detected as in "fixed trail (1407 in FIG. 14)" and a trail that moves is detected as a trail other than a star as a "trail 1 (1408 in FIG. 14)", and pixel addresses of each group are stored in memory.

Description of the Effect of the Third Embodiment

Figure 15:
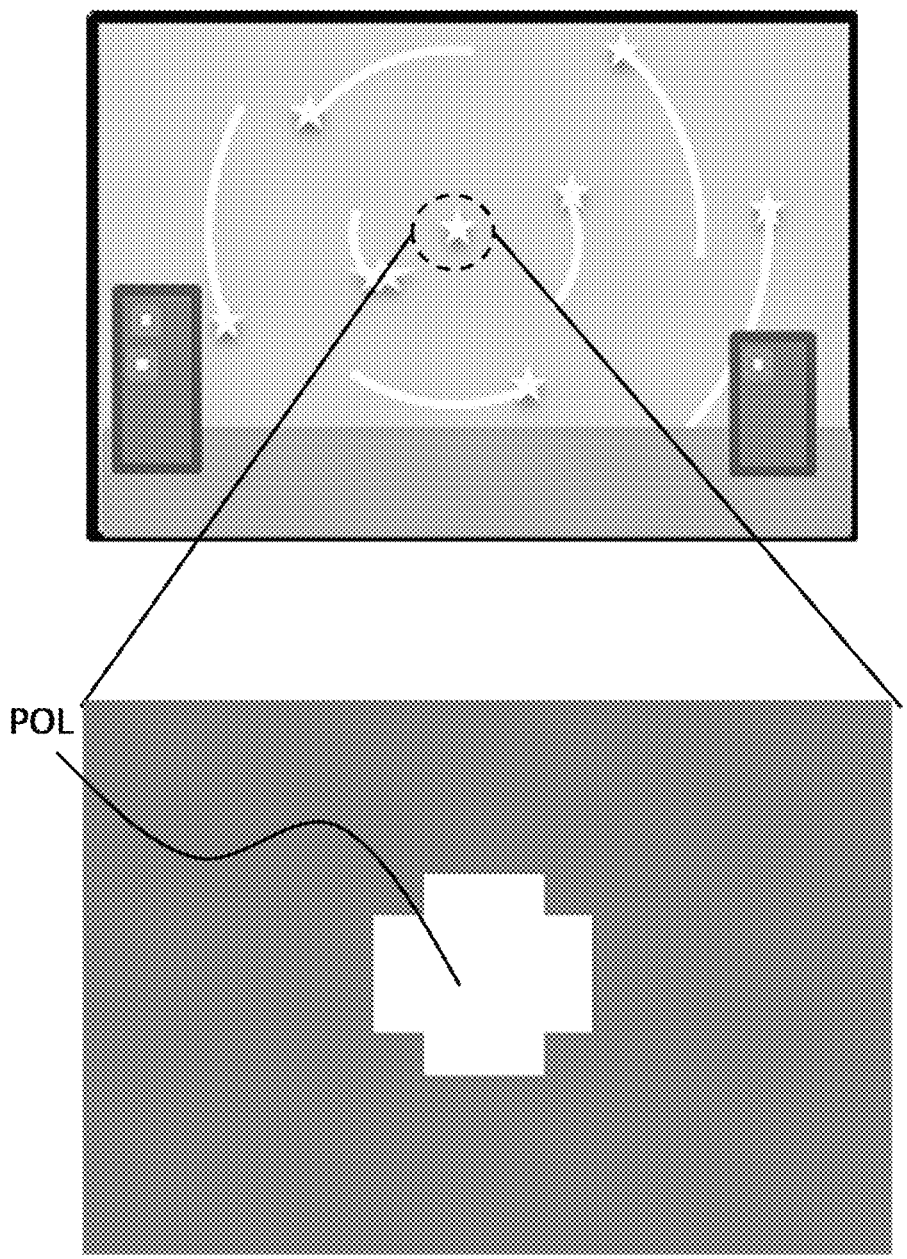
FIG. 15 is a drawing showing the effect achieved by adopting the third embodiment of the present invention.

In this way, with this embodiment movement direction and movement velocity of the star actually captured in image data are calculated, and it is possible to detect a movement trail of a star with high precision. By detection trails by combining the trail analysis and detection procedures of the second embodiment, and further combining the trail detection procedures of the first embodiment, as with this embodiment, it is further possible to detect trails of objects other than stars. Specifically, with this embodiment, unnecessary trails and required trails are selected from combined image data and it is possible to combine image data so that the unnecessary trails are not captured and necessary trails are captured in combined image data. As a specific effect of this embodiment, for example, it is possible to detect stars and subjects other than stars even if shooting is carried out such that the North Star POL is captured, as in FIG. 15. Since the North Star does not move, it will not move no matter by how much the shutter speed is extended or if number of combination frames is increased.

Therefore, if a trail is detected using the previously described second embodiment the North Star is detected not as a star trail but as bright pixels that do not move. However, if the method of this embodiment is used, since it is possible to calculate the movement direction and movement amount of a star at each position in an image using the astral body trail calculation section 1405, it is also possible to detect the North Star which does not move, and it becomes possible to accurately detect the North Star also as being a star.

It should be noted that with this embodiment three groups were detected, namely bright pixels that do not move, trails for other than a star, and star trails, but only two groups of bright pixels may be detected, namely star trails and trails of other than a star. There may be cases where extracting only star trails from image data meets with the photographer's intention, and in this case it is not necessary to carry out further detection of trails for other than stars, and it is possible to reduce the blocks necessary for trail analysis processing, and to reduce processing time.

Also, although description has been given in this embodiment of a structure in which a GPS detection section is fitted inside a digital camera, this is not limiting, and GPS information that has been detected by a GPS detection section within a smart phone etc. may be acquired by means of wireless communication. Also, for example, the photographer may perform operational inputs to the digital camera, to input shooting location (for example, Tokyo), and latitude information can be referenced from the name of a city. In this case, it is possible to ascertain latitude information from the city name even if a wireless communication section or GPS information detection section are not provided in the digital camera.

As has been described above, in the image processing device of each of the embodiments and modified examples of the present invention, when creating a photograph in which light trail are taken by combining a plurality of frames of image data, it is possible to detect various light trails that have been captured in the image data. Based on the results of this detection, it is possible to automatically remove unnecessary light trails from image data in which various light trails have been captured, using image processing of a digital camera or PC, and it is possible to carry out image processing that adds required light trails to a combined image in which light trails have not been captured.

Also, using the trail detection results, a photographer using the digital camera or a user of the image processing device can carry out processing by manual operation for every light trail, such as removing from combined image data, or adding to the combined image data, or adjusting image quality, such as brightness or color, independently for every trail during shooting or after shooting.

Further, if trail detection results are displayed together with combined image data (for example, if it is made easy to see only specified trails by being subjected to reversed display), the user of this image processing device can ascertain results where each trail that has been captured in combined image data has been detected while looking at image data. In this way, it becomes easy to carry out different processing for each of the above-described trails, it also becomes possible to change threshold levels for carrying out trail detection again while looking at an image and to detect a trail again, and it becomes possible to carry out image combination and image processing with a higher degree of freedom.

Further, the image processing section 14, image combination section 16, image analysis section 17, pixel address replacement section 18 etc., besides being constructed using hardware circuits and simple parts, may also be constructed in the form of software using a CPU and programs, or may be constructed in hardware such as gate circuitry generated based on a programming language described using Verilog, or may use a hardware structure that uses software such as a DSP (digital signal processor). Suitable combinations of these approaches may also be used.

It should be noted that while each of the embodiments and modified examples described in this specification are described for an image processing device built into a digital camera, this is not limiting, and as a camera it is possible to have a single lens reflex digital camera, a compact digital camera with built-in lens, a camera for movie used such as a video camera, or a camera that is built into a mobile phone, a smartphone, a portable information terminal (PDA: Portable Digital Assistant) or game console etc., and it is also possible to have an image processing device that processes images that have been taken with a camera. Also, a device for shooting image data, such as a camera, need not be built-in, and may also be a PC, smartphone or mobile information terminal that is provided with an image processing function. In any event the present invention can be applied to any device that is capable of image processing.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An image processing device comprising:
a processor for image processing, having a trail extraction section, a trail determination section, a trail detection section and a comparatively dark combination section, that executes instructions for implementing operations in each section as follows:
   the trail extraction section extracts a region where pixel values continuously become a given value or more, within image data made up of a plurality of pixel values, as a trail, and extracts a trail based on movement of a bright point that has been captured in the image data;
   the trail determination section determines movement state of the trail that has been extracted by the trail extraction section, the movement state corresponding to at least one of movement velocity or movement direction of the bright point;
   the trail detection section detects type of the trail based on movement state that has been determined by the trail determination section; and
   the comparatively dark combination section subjects image data of at least two frames to comparatively dark combination,
   wherein the trail extraction section extracts a region where the image data, and comparatively dark combination image data that has been subjected to the comparatively dark combination, respectively become the given value or more, as a trail,
   the trail determination section determines movement state of a trail of the image data by determining whether or not an extracted trail for the image data includes pixel addresses of an extracted trail for the comparatively dark combination image data, and
   the trail detection section, based on determination results of the trail determination section, detects types of trails, among trails that have been extracted by the trail extraction section from the image data, by making trails that contain pixel addresses of trails that have been extracted by the trail extraction section from the comparatively dark combination image data low movement speed trails, and making trails that do not contain pixel addresses of trails that have been extracted by the trail extraction section from the comparatively dark combination image data high movement speed trails.

2. The image processing device of claim 1, wherein:
the trail determination section is provided with a speed and direction detection section that detects at least one of movement velocity or movement direction from shape of the trail, and determines movement states of the trail based on detection results, and
the trail detection section determines types of trail based on determination results of the trail determination section.

3. The image processing device of claim 1, wherein the image data in which the trail detection section detects types of trails is at least one of either image data of a single frame before carrying out combination, or comparatively bright combination image data or additively combined image data.

4. An image processing device comprising:
a processor for image processing, having a trail extraction section, trail determination section, and trail detection section, that executes instructions for implementing operations in each section as follows:
the trail extraction section extracts a region where pixel values continuously become a given value or more, within image data made up of a plurality of pixel values, as a trail, and extracts a trail based on movement of a bright point that has been captured in the image data;
the trail determination section determines movement state of the trail that has been extracted by the trail extraction section, the movement state corresponding to at least one of movement velocity or movement direction of the bright point; and
the trail detection section detects type of the trail based on movement state that has been determined by the trail determination section;
wherein the trail determination section further executes instructions to implement:
a speed and direction detection section that detects at least one of movement velocity or movement direction from shape of the trail,
a GPS detection section that detects GPS information at the time of acquiring the image data,
a geomagnetism detection section that detects orientation at the time of acquiring the image data,
an acceleration detection section that detects direction relative to the direction of gravitational force at the time of acquiring the image data,
an astral body trail calculation section that calculates a trail of an astral body based on the GPS information, the orientation information, the direction relative to the direction of gravitational force, and shooting information at the time of data acquisition, and
a speed and direction comparison section that compares detection results of the trail determination section and calculation results of the astral body trail calculation section,
wherein the trail determination section determines the movement state of trails based on comparison results of the speed and direction comparison section, and
the trail detection section detects whether a type of trail is a trail of an astral body or a trail that does not relate to an astral body, based on determination results of the trail determination section.

5. The image processing device of claim 4, wherein:
the trail determination section is provided with a speed and direction detection section that detects at least one of movement velocity or movement direction from shape of the trail, and determines movement states of the trail based on detection results, and
the trail detection section determines types of trail based on determination results of the trail determination section.

6. The image processing device of claim 4, wherein the image data in which the trail detection section detects types of trails is at least one of either image data of a single frame before carrying out combination, or comparatively bright combination image data or additively combined image data.

7. An image processing device comprising:
a processor for image processing, having a trail extraction section, trail determination section, trail detection section, image combination section, and pixel address replacement section, that executes instructions for implementing operations in each section as follows:
the trail extraction section extracts a region where pixel values continuously become a given value or more, within image data made up of a plurality of pixel values, as a trail, and makes a trail based on movement of a bright point that has been captured in the image data;
the trail determination section determines movement state of the trail that has been extracted by the trail extraction section, the movement state corresponding to at least one of movement velocity or movement direction of the bright point;
the trail detection section detects type of the trail based on movement state that has been determined by the trail determination section;
the image combination section is provided with at least one of either a comparatively bright combination section that subjects image data of at least two or more frames to comparatively bright combination or an additive combination section that subjects the image data of at least two or more frames to additive combination, and at least one of either a comparatively dark combination section that subjects image data of at least two or more frames to comparatively dark combination or an averaging combination section that subjects the image data of at least two or more frames to averaging combination; and
the pixel address replacement section makes pixel addresses of at least one type of trail, of the trails that have been detected by the trail detection section, replacement pixel addresses, and replaces pixel values of the replacement pixel addresses of the image data or the comparatively bright combination image data or the additively combined image data with pixel values of the replacement pixel addresses of the comparatively dark combination image data or the averaging combination image data, or replaces pixel values of the replacement pixel addresses of the comparatively dark combination image data or the averaging combination image data with pixel values of the replacement pixel addresses of the image data or the comparatively bright combination image data or additively combined image data.

8. An image processing method comprising:
extracting a region where a plurality of pixel values constituting image data continuously become a given value or more as a trail;
determining movement state of the trail based on the extracted trail; and
carrying out processing to detect type of each of the trails based on the determined movement state;

carrying out combination processing of at least one of either comparatively bright combination processing that subjects image data of at least two or more frames to comparatively bright combination or additive combination processing that subjects the image data of at least two or more frames to additive combination;

carrying out combination processing of at least one of either comparatively dark combination processing that subjects image data of at least two or more frames to comparatively dark combination or averaging combination processing that subjects the image data of at least two or more frames to averaging combination; and carrying out processing to make pixel addresses of at least one type of trail, of the detected trails, replacement addresses, and to replace pixel values of the replacement pixel addresses of the image data or the comparatively bright combination image data or the additively combined image data with pixel values of the replacement pixel addresses of the comparatively dark combination image data or the averaging combination image data.

\* \* \* \* \*